United States Patent
Shimazaki et al.

(10) Patent No.: US 12,319,854 B2
(45) Date of Patent: Jun. 3, 2025

(54) PROTECTIVE SHEET

(71) Applicant: NITTO DENKO CORPORATION, Ibaraki (JP)

(72) Inventors: Yuta Shimazaki, Ibaraki (JP); Kosuke Yonezaki, Ibaraki (JP); Hakaru Horiguchi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 678 days.

(21) Appl. No.: 17/418,346

(22) PCT Filed: Dec. 23, 2019

(86) PCT No.: PCT/JP2019/050317
§ 371 (c)(1),
(2) Date: Jun. 25, 2021

(87) PCT Pub. No.: WO2020/137956
PCT Pub. Date: Jul. 2, 2020

(65) Prior Publication Data
US 2022/0063180 A1 Mar. 3, 2022

(30) Foreign Application Priority Data

Dec. 27, 2018 (JP) ................ 2018-246231
Dec. 27, 2018 (JP) ................ 2018-246232
Jun. 26, 2019 (JP) ................ 2019-118313

(51) Int. Cl.
*C09J 7/38* (2018.01)
*B29C 65/00* (2006.01)
(Continued)

(52) U.S. Cl.
CPC ............ *C09J 7/385* (2018.01); *B29C 66/92* (2013.01); *C08K 3/16* (2013.01); *C08K 5/17* (2013.01);
(Continued)

(58) Field of Classification Search
None
See application file for complete search history.

(56) References Cited

U.S. PATENT DOCUMENTS 5,126,178 A  6/1992 Takemura et al.
5,814,685 A  9/1998 Satake et al.
(Continued)

FOREIGN PATENT DOCUMENTS

CN  102898966 A  1/2013
CN  104073196 A  10/2014
(Continued)

OTHER PUBLICATIONS

Machine translation of JP 2017186517 A (Year: 2017).*
(Continued)

*Primary Examiner* — Frank D Ducheneaux
(74) *Attorney, Agent, or Firm* — Sughrue Mion, PLLC

(57) ABSTRACT

Provided is a Low-E glass plate protective sheet that can have protective properties for a Low-E glass plate as an object to be protected and can maintain good removability while preventing or inhibiting surface contamination of the object to be protected even when prolongedly adhered thereto. The Low-E glass plate protective sheet is provided. The protective sheet has a PSA layer. The PSA layer comprises at least 95% base polymer by weight.

20 Claims, 2 Drawing Sheets

(51) Int. Cl.
  *C08K 3/16* (2006.01)
  *C08K 5/17* (2006.01)
  *C08K 5/29* (2006.01)
  *C09J 7/20* (2018.01)
  *C09J 133/08* (2006.01)
  *C08K 5/00* (2006.01)

(52) U.S. Cl.
  CPC ............ *C08K 5/29* (2013.01); *C09J 7/20* (2018.01); *C09J 133/08* (2013.01); *C08K 5/0025* (2013.01); *C08K 5/005* (2013.01); *C09J 2301/122* (2020.08); *C09J 2301/302* (2020.08); *C09J 2301/408* (2020.08); *C09J 2301/502* (2020.08); *C09J 2433/00* (2013.01)

(56) References Cited

U.S. PATENT DOCUMENTS

| | | | |
|---|---|---|---|
| 7,396,871 | B2 | 7/2008 | Shoaf et al. |
| 9,458,360 | B2 * | 10/2016 | Kim ................ C09J 133/06 |
| 2007/0148444 | A1 | 6/2007 | Kamiya et al. |
| 2010/0063184 | A1 | 3/2010 | Dershem |
| 2012/0135231 | A1 | 5/2012 | Yoshida et al. |
| 2012/0219795 | A1 | 8/2012 | Mitsui et al. |
| 2013/0344327 | A1 | 12/2013 | Yoshida et al. |
| 2014/0295183 | A1 | 10/2014 | Yamagata et al. |
| 2017/0283661 | A1 | 10/2017 | Yonezaki et al. |
| 2019/0202171 | A1 | 7/2019 | Yonezaki et al. |

FOREIGN PATENT DOCUMENTS

| | | | |
|---|---|---|---|
| CN | 104768752 | A | 7/2015 |
| CN | 105619979 | A | 6/2016 |
| CN | 105793039 | A | 7/2016 |
| CN | 106003910 | A | 10/2016 |
| CN | 107267080 | A | 10/2017 |
| EP | 0 442 736 | A2 | 8/1991 |
| EP | 2 150 669 | B1 | 2/2016 |
| EP | 3 064 479 | A1 | 9/2016 |
| EP | 3 904 084 | A1 | 11/2021 |
| EP | 3 904 087 | A1 | 11/2021 |
| EP | 3 904 088 | A1 | 11/2021 |
| JP | 4-211145 | A | 8/1992 |
| JP | 2002294193 | A * | 10/2002 |
| JP | 2004-175960 | A | 6/2004 |
| JP | 3571460 | B2 | 9/2004 |
| JP | 3733405 | B2 | 1/2006 |
| JP | 2009-74083 | A | 4/2009 |
| JP | 2009-277652 | A | 11/2009 |
| JP | 2012046681 | A * | 3/2012 |
| JP | 2012-131976 | A | 7/2012 |
| JP | 2013035920 | A * | 2/2013 ............ C09J 11/06 |
| JP | 5719194 | B2 | 5/2015 |
| JP | 2015-128897 | A | 7/2015 |
| JP | 2017-92122 | A | 5/2017 |
| JP | 2017-186517 | A | 10/2017 |
| WO | 2016/139318 | A1 | 9/2016 |
| WO | 2019/176719 | A1 | 9/2019 |

OTHER PUBLICATIONS

Machine translation of JP 2012046681 A JP 2012046681 A (Year: 2012).*
Machine translation of JP 2013035920 A (Year: 2013).*
Machine translation of JP 2002294193 A (Year: 2002).*
Third Office Action issued Sep. 5, 2023 in Chinese Application No. 201980086439.1.
Extended European Search Report dated Aug. 1, 2022 in European Application No. 19904670.7.
International Search Report of PCT/JP2019/050317 dated Feb. 10, 2020 [PCT/ISA/210].
International Search Report dated Feb. 18, 2020 in Application No. PCT/JP2019/050316.
Extended European Search Report dated Aug. 1, 2022 in European Application No. 19906325.6.
First Office Action dated Dec. 28, 2022 issued by China National Intellectual Property Administration in Chinese Application No. 201980086425.X.
Second Office Action dated Jul. 18, 2023 in Chinese Application No. 201980086425.X.
Non-Final Office Action dated Oct. 27, 2023 in U.S. Appl. No. 17/418,557.
Machine translation of JP 2012-046681.
Machine translation of JP 2017-186517.
Second Office Action dated Jun. 12, 2023 issued by the State Intellectual Property Office of the P.R. China in application No. 201980086439.1.
First Office Action dated Jan. 10, 2023 issued by the China National Intellectual Property Administration in Chinese Application No. 201980086439.1.
Non-Final Office Action issued Jan. 17, 2024 in U.S. Appl. No. 17/418,395.
"The Homeowners Guide to Low E Glass" from Window World of Southern Nevada, pp. 1-12, Nov. 19, 2020 (Year: 2020).
Second Office Action issued Aug. 8, 2023 in CN Application No. 201980086490.2.
First Office Action dated Jan. 20, 2023 from the Chinese Patent Office in Application No. 201980086490.2.
Extended European Search Report dated Aug. 1, 2022 in European Application No. 19906458.5.
International Search Report for PCT/JP2019/050315 dated, Feb. 10, 2020.
Restriction Requirement issued Oct. 26, 2023 by the United States Patent and Trademark Office in U.S. Appl. No. 17/418,395.
Decision of Final Rejection dated Nov. 29, 2023 in Chinese Application No. 201980086425.X.
Decision of Final Rejection dated Jan. 5, 2024 issued in CN Application No. 201980086439.1.
Final Office Action dated May 8, 2024 in U.S. Appl. No. 17/418,557.
"Thermal Transitions of Homopolymers: Glass Transition & Melting Point", Aldrich Data Sheet , 2019, pp. 52-53 (2 pages).
Non-Final Office Action issued by the USPTO dated Aug. 8, 2024 in U.S. Appl. No. 17/418,557.
Final Office Action issued by the USPTO dated Sep. 5, 2024 in U.S. Appl. No. 17/418,395.
Decision of Final Rejection dated Feb. 27, 2024 in Chinese Application No. 201980086490.2.
Xiaochuan Zhang, "Polyvinyl Chloride Film", Light Industry Press, May 31, 1980, pp. 224-225 (3 pages total).

* cited by examiner

Fig. 2(A) Preparation
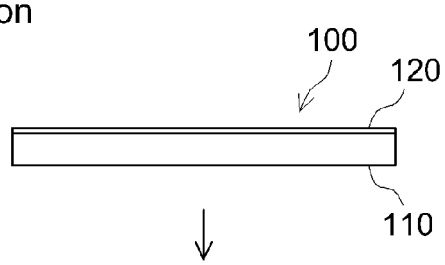
Fig. 2(B) Application
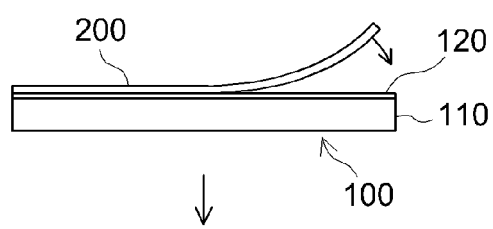
Fig. 2(C) Protection
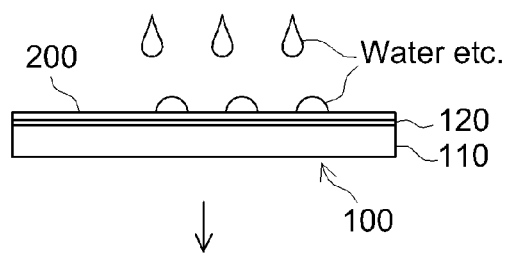
Fig. 2(D) Removal
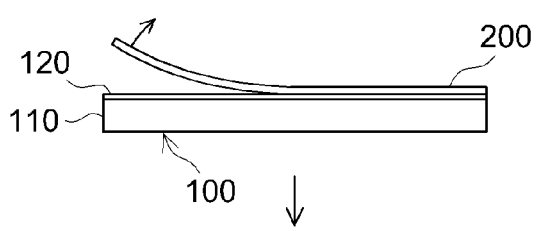
Fig. 2(E) Assembly
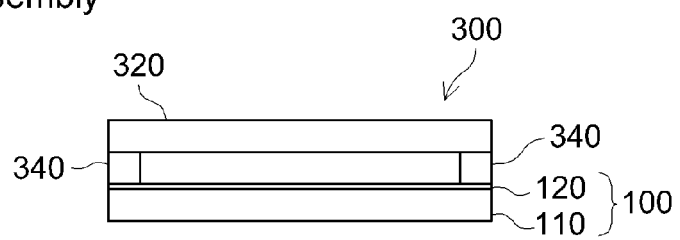

PROTECTIVE SHEET

TECHNICAL FIELD

The present invention relates to a protective sheet.

The present application is a National Stage of International Application No. PCT/JP2019/050317, filed Dec. 23, 2019, claiming priority based on Japanese Patent Applications No. 2018-246231 and No. 2018-246232 each filed on Dec. 27, 2018, and No. 2019-118313 filed on Jun. 26, 2019; the entire content thereof is incorporated herein by reference.

BACKGROUND ART

In processing and transporting various articles, in known techniques to prevent damage (scratches, contamination, corrosion, etc.) of their surfaces, protective sheets are bonded to the surfaces for protection. The objects to be protected vary widely. For instance, protective sheets are used on glass plates bearing Low-E (Low-Emissivity) layers (or Low-E glass plates) as well. Low-E glass plates are preferably used as building materials such as window glass because of the effects of the Low-E layers to improve the efficiency to cool down and heat up indoor spaces. In producing a Low-E glass plate, usually, until a Low-E glass plate and another glass plate are assembled into a pair glass (e.g. dual-pane glass) with the Low-E layer surface on the inside, a protective sheet is applied to the Low-E layer surface which will be otherwise left exposed. This protects the Low-E layer from damage, wearing, degradation, corrosion, etc. Conventional art documents related to methods for producing glass units include Patent Documents 1 and 2.

For the surface protection, as a removable bonding means, pressure-sensitive adhesive (or PSA; the same applies hereinafter) can be preferably used. In general, pressure-sensitive adhesive has characteristics of being in a soft solid (viscoelastic) state in a room temperature range and easily adhering to adherend under some pressure. A surface protective sheet using PSA typically has a PSA layer on one face of a substrate sheet formed of a material such as resin and is constituted so as to achieve a protection purpose when the PSA layer is applied to an adherend (an object to be protected). Conventional art documents disclosing PSA sheets usable as surface protective sheets include Patent Documents 3 to 6. Patent Document 3 discloses a surface protective sheet that protects the surface of a metal plate while it is being drawn. Patent Document 4 discloses a surface protective sheet for optical film such as polarizing plates. Patent Document 5 relates to a surface protective sheet for a self cleaning hydrophilic coated plate. Patent Document 6 is directed to easy removal of a surface protective sheet for metal plates on which top coats are formed and to reduction of the degree of contamination caused by it.

CITATION LIST

Patent Literature

[Patent Document 1] European Patent No. 2150669

[Patent Document 2] WO 2016/139318

[Patent Document 3] Japanese Patent Application Publication No. 2017-186517

[Patent Document 4] Japanese Patent No. 5719194

[Patent Document 5] Japanese Patent Application Publication No. 2012-131976

[Patent Document 6] Japanese Patent No. 3571460

SUMMARY OF INVENTION

Solution to Problem

Low-E glass plates can be protected with protective sheets when exposed to external environments and subjected to processes such as processing and washing. Having good adhesive strength to not cause lifting or peeling from a Low-E glass plate as the object to be protected, the protective sheet tightly adhered to the Low-E glass plate surface so as to protect the Low-E glass plate from physical damage such as breakage and wear as well as to block entrance of water, moisture and the like to prevent degradation and corrosion of the Low-E layer. After the protection period ends, the protective sheet needs to be removed from the object being protected without leaving PSA residue, etc. However, for Low-E glass plate transportation, storage and so on, protection with the protective sheet sometimes needs to last for a long period. When used in such an embodiment, the adhesive strength may increase due to changes in temperature, etc., and the intended removability may not be maintained. As a solution, an adhesive strength adjuster may be added to reduce the increase in aged adhesive strength; however, the adhesive strength adjuster may transfer to the adherend surface, contaminating the surface of the object to be protected.

The present invention has been created in view of such a problem with an objective to provide a Low-E glass plate protective sheet that can have protective properties for a Low-E glass plate as an object to be protected and can maintain good removability while preventing or inhibiting surface contamination of the object to be protected even when prolongedly adhered thereto.

Solution to Problem

The present description provides a Low-E glass plate protective sheet. The protective sheet has a PSA layer. The PSA layer comprises at least 95% base polymer by weight. In such an embodiment, even when prolongedly adhered to an object to be protected, the protective sheet can maintain good removability while preventing or inhibiting surface contamination of the object being protected. This is based on the knowledge that, in a PSA for Low-E glass plate protection, an increase in usage of other components besides the base polymer tends to result in compromised aged removability. When the PSA is largely formed of the base polymer, it can have aimed Low-E glass plate protective properties while limiting the usage of additives that affects the aged removability and also preventing or inhibiting surface contamination of the object to be protected.

The protective sheet according to some preferable embodiments has a chloride ion amount of less than 300 µg per gram of PSA, determined by hot water extraction. In such an embodiment, without adding an anti-corrosive component such as rust inhibitor or while limiting its usage, erosion in Low-E glass plates can be prevented for a long period. With respect to this, the present inventors have observed degradation and corrosion (or comprehensively "erosion" hereinafter) of a Low-E glass plate being protected despite of sufficient protection by a protective sheet; have found upon studies that erosion of Low-E layers can be caused by the protective sheet itself; and have learned that the erosion is caused by chloride ions contained in the protective sheets; and have realized an embodiment capable of preventing erosion in Low-E glass plates for a long period, by limiting the chloride ion amount in the PSA.

In some preferable embodiments, the PSA layer is formed from a water-dispersed PSA composition. From the standpoint of the environmental sanity, etc., water-dispersed PSA compositions are more desirable than solvent-based PSA compositions in which adhesive components are dissolved in organic solvents. In such an embodiment, the effect (combination of protective properties such as anti-corrosion and aged removability) of the art disclosed herein can be preferably obtained.

In some preferable embodiments, the PSA layer includes 3% rust inhibitor by weight or less. The PSA layer in this embodiment is free of a rust inhibitor or includes up to the prescribed level of rust inhibitor. While rust inhibitor is a preferable additive for use in Low-E glass plates from the standpoint of preventing corrosion, etc., an increase in its usage tends to result in compromised aged removability. By limiting the use of rust inhibitor to or below the prescribed level, the increase in aged adhesive strength can be reduced to preferably maintain good removability. In some embodiments, the PSA layer comprises the rust inhibitor. By this, anti corrosive properties can be preferably obtained. A favorable example of usable rust inhibitor is an amine-based rust inhibitor. In an embodiment using an amine-based rust inhibitor, by limiting its amount contained, anti-corrosive properties can be preferably combined with aged removability.

In some preferable embodiments, the base polymer is selected among acrylic polymers and rubber-based polymers. Preferable PSA (layers) in the art disclosed herein include acrylic PSA comprising an acrylic polymer and rubber-based PSA comprising a rubber-based polymer.

In some preferable embodiments, the base polymer is crosslinked with a crosslinking agent. By using a polymer crosslinked with a crosslinking agent as the base polymer, a protective sheet having good removability is preferably obtained. Favorable examples of the crosslinking agent include oxazoline-based crosslinking agents. In an embodiment using an oxazoline-based crosslinking agent, the effect (aged removability) of the art disclosed herein can be preferably obtained.

The protective sheet according to some preferable embodiments has a substrate layer. The substrate layer supports a PSA layer and the protective sheet has a substrate layer and a PSA layer formed on one face of the substrate layer. This embodiment is suited for protecting Low-E glass plates. The substrate layer is more preferably formed from a resin film. As such a substrate layer, it is preferable to use a substrate layer formed from a polyolefinic resin film, a substrate layer formed from a polyester-based resin film, or a substrate layer formed from a vinyl chloride resin film.

The protective sheet disclosed herein preferably has a 180° peel strength of 3.3 N/20 mm or less to a Low-E glass plate after applied thereon at 50° C. for one week. The PSA sheet satisfying this property can be removed well from the adherend as the aged adhesive strength is sufficiently reduced even when adhered to the adherend for a long period.

BRIEF DESCRIPTION OF DRAWINGS

FIGS. 2(A) to 2(E) show a schematic diagram illustrating an embodiment of the glass unit production method.

DESCRIPTION OF EMBODIMENTS

Figure 1:
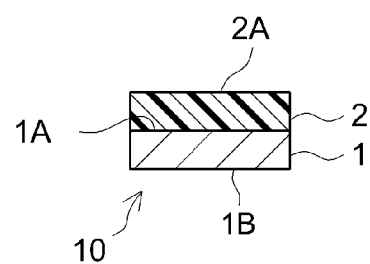
FIG. 1 shows a cross-sectional diagram schematically illustrating an embodiment of the protective sheet.

Preferred embodiments of the present invention are described below. Matters necessary to practice this invention other than those specifically referred to in this description can be understood by a person skilled in the art based on the disclosure about implementing the invention in this description and common technical knowledge at the time of application. The present invention can be practiced based on the contents disclosed in this description and common technical knowledge in the subject field.

As used herein, the term "PSA" refers to, as described earlier, a material that exists as a soft solid (a viscoelastic material) in a room temperature range and has a property to adhere easily to an adherend with some pressure applied. As defined in C. A. Dahlquist, "Adhesion: Fundamental and Practice" (McLaren & Sons (1966), P. 143), the PSA referred to herein is a material that has a property satisfying complex tensile modulus $E^*$ (1 Hz)$<10^7$ dyne/cm$^2$ (typically, a material that exhibits the described characteristics at 25° C.).

The concept of protective sheet herein may encompass so-called PSA sheet, PSA tape, PSA labels, PSA film, etc. The protective sheet disclosed herein can be in a roll or in a flat sheet. Alternatively, the protective sheet may be processed into various shapes.

<Constitution of Protective Sheet>

The protective sheet disclosed herein typically has a PSA layer on a substrate layer (support substrate). FIG. 1 shows a cross-sectional structure of the protective sheet according to an embodiment. Protective sheet 10 comprises a PSA layer 2 provided on the first face 1A of a substrate-layer sheet 1. When used, it is applied to an adherend over the face 2A of PSA layer 2. The back face 1B (on the reverse side of the first face 1A) of substrate layer 1 is also the back face of protective sheet 10, forming the outer surface of protective sheet 10. Prior to use (i.e. before applied to the adherend), protective sheet 10 can be in a form where the face 2A (adhesive face, i.e. the bonding surface to the adherend) of PSA layer 2 is protected with a release liner (not shown in the drawing) having a release face at least on the PSA layer side. Alternatively, protective sheet 10 may be in a form where, with the second surface (back face) 1B of substrate layer 1 being a release face, protective sheet 10 is wound in a roll so that the back face comes in contact with the PSA layer 2 to protect the surface (adhesive face) 2A.

As the release liner, commonly used release paper and the like can be used without particular limitations. For instance, a release liner having a release layer on a surface of a liner substrate such as plastic film and paper, a release liner formed from a low-adhesive material such as fluorinated polymer (polytetrafluoroethylene, etc.) and polyolefinic resin, and the like can be used. The release layer can be formed by subjecting the liner substrate to surface treatment with various release agents including silicone-based, long-chain alkyl-based, and fluorinated kinds as well as molybdenum sulfide.

The protective sheet disclosed herein is not particularly limited in width. For instance, by using a protective sheet having a width of about 1 m or greater or even about 1.5 m or greater, a Low-E glass plate having a relatively large surface area can be efficiently protected. The protective sheet according to some preferable embodiments has a width of about 2 m or greater. With such a broad protective sheet, a large Low-E glass plate can be protected with a single sheet or a few sheets. For protecting the Low-E glass plate, it is preferable to use a protective sheet having a width of, for instance, about 2.5 m or greater, or even about 2.6 m or greater. The protective sheet's width can be greater than 2.6 m (e.g. 3 m or greater, or even about 3.3 m or greater). The maximum width of the protective sheet is not particularly limited. From the standpoint of the productivity, handling properties, etc., it is suitably about 5 m or less, for instance, possibly about 4 m or less.

The protective sheet disclosed herein can be specified by the plane (sheet face) having a long side and a short side. The long side is defined longer than the short side and the short side is defined shorter than the long side. For instance, the short side may orthogonally intersect the long side. The protective sheet's length direction coincides with the long side and the width direction orthogonally intersects the length direction. Accordingly, as used herein, the "width" is defined as the length (distance) in the direction orthogonal to the length direction. Long-length, belt like and oblong protective sheets are typical examples of the protective sheet disclosed herein. While the long side extends almost linearly, the short side is not limited to a straight line and can be a curve, zigzag, etc. For instance, in a long protective sheet, the length (distance in the length direction) is equal to or greater than the width.

The thickness of the protective sheet disclosed herein is not particularly limited. From the standpoint of the handling properties, the lightness of weight, etc., it is suitably about 1000 μm or less (typically about 300 μm or less, e.g. about 150 μm or less). In some embodiments, the thickness of the protective sheet is preferably about 120 μm or less, more preferably about 100 μm or less, yet more preferably about 75 μm or less, or possibly, for instance, less than 60 μm. The thickness of the protective sheet can be typically greater than 20 μm, preferably greater than 30 μm, or more preferably greater than 40 μm, for instance, greater than 45 μm.

As used herein, the thickness of the protective sheet includes the thicknesses of the PSA layer and the substrate layer, but excludes the thickness of the release liner.

<PSA Layer>

The PSA layer disclosed herein is characterized by comprising at least 95% base polymer by weight. According to the art disclosed herein, in the embodiment comprising at least 95% base polymer by weight, it can exhibit protective properties capable of preventing degradation and corrosion of Low-E glass plates. With the base polymer content being at least 95% by weight, it can help limit the usage of additives that affect the aged removability and maintain good removability even when prolongedly adhered to an adherend. When the PSA is largely formed of base polymer, the transfer of additives and the like to the adherend surface is limited and contamination of the adherend surface can be prevented or inhibited. From the standpoint of the aged removability, the base polymer content of the PSA layer is preferably about 96% by weight or higher, more preferably about 97% by weight or higher, or possibly about 98% by weight or higher (e.g. about 99% by weight or higher). To obtain aimed properties (e.g. anti corrosive properties, tight adhesion, etc.), the maximum base polymer content of the PSA layer can also be 99.5% by weight or less, 98.5% by weight or less, or even 97.5% by weight or less.

As used herein, the base polymer of a PSA layer refers to the polymer constituting the layer formed of PSA and serving as an adhesive component (or an "adhesive polymer"). The weight of base polymer in the PSA layer includes that of any crosslinking agent bonded to the base polymer via crosslinking reaction. Similarly, with respect to a base polymer obtained by emulsion polymerization using a reactive surfactant, the weight of base polymer includes that of the reactive surfactant incorporated in the base polymer after the polymerization reaction.

The type of base polymer is not particularly limited. Accordingly, the type of PSA forming the PSA layer disclosed herein is not particularly limited. The PSA layer may be formed from a PSA composition comprising, as the base polymer, one, two or more species selected among various polymers (adhesive polymers), such as acrylic, polyester-based, urethane-based, polyether-based, rubber-based, silicone-based, polyamide-based, and fluorinated polymers. The art disclosed herein can be preferably made, for instance, as a protective sheet comprising an acrylic PSA layer or a rubber-based PSA layer.

The "acrylic PSA layer" here refers to a PSA layer comprising an acrylic polymer as the base polymer. Similarly, the "rubber-based PSA layer" refers to a PSA layer comprising a rubber-based polymer as the base polymer. The "acrylic polymer" refers to a polymer whose primary monomer (the primary component among the monomers, i.e. a component that accounts for 50% by weight or more of the total amount of the monomers forming the acrylic polymer) is a monomer having at least one (meth)acryloyl group per molecule. Such a monomer may be referred to as an "acrylic monomer" hereinafter. As used herein, the "(meth)acryloyl group" comprehensively refers to acryloyl group and methacryloyl group. Similarly, the "(meth)acrylate" comprehensively refers to acrylate and methacrylate.

(Acrylic Polymer)

A preferable example of the acrylic polymer is a polymer of a starting monomer mixture that comprises an alkyl (meth)acrylate (or a monomer A hereinafter) and may further comprise another monomer (or a monomer B hereinafter) that is copolymerizable with the alkyl (meth)acrylate. The acrylic polymer typically has a monomer unit composition corresponding to the monomer composition of the starting monomer mixture.

A preferable monomer A is an alkyl (meth)acrylate represented by the next general formula (1):

$$CH_2=C(R^1)COOR^2 \qquad (1)$$

Here, $R^1$ in the formula (1) is a hydrogen atom or a methyl group. $R^2$ is an alkyl group having 1 to 20 carbon atoms. Hereinafter, such a range of the number of carbon atoms may be indicated as "$C_{1-20}$." From the standpoint of the polymerization reactivity, polymerization stability, etc., an alkyl (meth)acrylate wherein $R^2$ is a $C_{1-16}$ alkyl group is preferable, and an alkyl (meth)acrylate wherein $R^2$ is a $C_{1-12}$ (typically $C_{1-10}$, e.g. $C_{1-8}$) alkyl group is more preferable.

Examples of an alkyl (meth)acrylate with $R^2$ being a $C_{1-20}$ alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. These alkyl (meth)acrylates can be used solely as one species or in a combination of two or more species.

The art disclosed herein can be preferably implemented in an embodiment where the alkyl acrylate as the monomer A accounts for about 50% by weight or more (more preferably about 75% by weight or more, yet more preferably about 90% by weight or more, e.g. about 95% by weight or more) of the total monomer content. As the alkyl acrylate, an alkyl acrylate with $R^2$ in the formula (1) being a $C_{1\text{-}20}$ alkyl group is preferable and an alkyl acrylate with $R^2$ being a $C_{1\text{-}12}$ (more preferably $C_{1\text{-}10}$, particularly preferably $C_{1\text{-}8}$) alkyl group is more preferable. The art disclosed herein can also be preferably implemented in an embodiment where the alkyl acrylate has a $C_{2\text{-}8}$ (typically $C_{4\text{-}8}$) alkyl group for $R^2$ in the formula (1). For the alkyl acrylate, solely one species or a combination of two or more species can be used. When two or more species of alkyl acrylate are used, to adjust the acrylic polymer's Tg to the most adequate range, etc., an alkyl acrylate A1 with $R^2$ being a $C_{4\text{-}20}$ (more preferably $C_{4\text{-}10}$, or yet more preferably $C_{4\text{-}8}$) alkyl group and an alkyl acrylate A2 with $R^2$ being a $C_{1\text{-}3}$ (more preferably $C_{1\text{-}2}$, e.g. $C_2$) alkyl group can be used together. In this embodiment, the alkyl acrylate A1 to alkyl acrylate A2 weight ratio (A1:A2) is not particularly limited. It is usually about 5:95 to 95:5, or suitably about 10:90 to 90:10, for instance, about 15:85 to 85:15.

In some preferable embodiments, the monomers include one, two or more species of alkyl methacrylate as the monomer A. With the use of the alkyl methacrylate, the base polymer can be preferably designed so as to exhibit desirable PSA properties. As the alkyl methacrylate, an alkyl methacrylate with $R^2$ in the formula (1) being a $C_{1\text{-}10}$ alkyl group is preferable and an alkyl methacrylate with $R^2$ being a $C_{1\text{-}4}$ (more preferably $C_1$ or $C_{2\text{-}4}$) alkyl group is more preferable. The alkyl methacrylate can be preferably used in combination with an alkyl acrylate. When an alkyl methacrylate and an alkyl acrylate are used together, with one, two or more species of alkyl methacrylate (e.g. $C_{2\text{-}4}$ alkyl methacrylate) having a weight $C_{AM}$ and one, two or more species of alkyl acrylate having a weight $C_{AA}$, their ratio ($C_{AM}$:$C_{AA}$) is not particularly limited. In some embodiments, it is about 1:9 to 9:1, suitably about 2:8 to 8:2, preferably about 3:7 to 7:3, or more preferably about 4:6 to 6:4. In other embodiments, the ratio of the weight $C_{AM}$ of the alkyl methacrylate (e.g. $C_1$ alkyl methacrylate, i.e. methyl methacrylate (MMA)) in the total amount ($C_{AM}$+$C_{AA}$) of the alkyl (meth)acrylate is about 30% by weight or lower, suitably about 20% by weight or lower, preferably about 10% by weight or lower, or more preferably about 7% by weight or lower. On the other hand, the lower limit is about 0.1% by weight or higher, suitably about 1% by weight or higher, or preferably about 2% by weight or higher (e.g. about 3% by weight or higher).

The art disclosed herein can be implemented in an embodiment where the monomers are essentially free of an alkyl methacrylate as the monomer A. In an embodiment using an alkyl methacrylate, it can be implemented, for instance, in an embodiment free of a $C_{1\text{-}3}$ alkyl methacrylate (typically MMA).

In other preferable embodiments, the acrylic polymer is a polymer of a starting monomer mixture that comprises an alkyl acrylate (or a monomer $m_A$, hereinafter) having 4 to 9 alkyl carbon atoms and may further comprise other monomer(s) as necessary. The acrylic polymer can be synthesized by polymerizing a starting monomer mixture having the corresponding composition (monomer composition) by a known method.

Non-limiting examples of monomer $m_A$ include n-butyl acrylate (BA), n-hexyl acrylate, 2-ethylhexyl acrylate (2EHA), n-octyl acrylate, n-nonyl acrylate and isononyl acrylate (iNA). A preferable alkyl acrylate includes a —$(CH_2)_3$— structure in the alkyl group and a more preferable alkyl acrylate includes a —$(CH_2)_4$— structure in the alkyl group. Favorable examples of monomer m include 2EHA, BA and iNA. For the monomer $m_A$, solely one species or a combination of two or more species can be used.

The amount of monomer $m_A$ used typically accounts for 40% by weight or more of the starting monomers used in the synthesis of acrylic polymer. From the standpoint of the flexibility and enhanced low temperature properties of the PSA layer comprising the acrylic polymer, it is advantageous that the monomer composition includes at least 40% monomer $m_A$ by weight. From such a standpoint, the ratio of monomer $m_A$ is preferably 45% by weight or higher, or possibly 50% by weight or higher (e.g. above 50% by weight). When the monomer composition includes 99.9% or less monomer $m_A$ by weight, the PSA layer comprising the acrylic polymer is likely to have suitable cohesion. From such a standpoint, the ratio of monomer $m_A$ is preferably 95% by weight or lower, more preferably 90% by weight or lower, or possibly 85% by weight or lower. In some embodiments, the ratio of monomer $m_A$ can be below 80% by weight or even below 70% by weight (e.g. 65% by weight or lower).

The acrylic polymer in the art disclosed herein may have a monomer composition comprising a carboxy group-containing monomer (or a monomer $m_B$, hereinafter) as the monomer B. In other words, a monomer $m_B$ may be copolymerized in the acrylic polymer. The monomer $m_B$ may be useful in introducing crosslinking points into the acrylic polymer and increasing the cohesive strength of the PSA layer comprising the acrylic polymer. The monomer $m_B$ may help enhance the anti-PSA-residue properties by increasing the tightness of adhesion (anchoring) between the acrylic polymer-containing PSA layer and the substrate layer. Examples of the carboxy group-containing monomer include ethylenically unsaturated monocarboxylic acids such as acrylic acid, methacrylic acid, crotonic acid, isocrotonic acid, carboxyethyl (meth)acrylate, carboxypentyl (meth)acrylate and 1-[2-(methacryloyloxy)ethyl] succinate; ethylenically unsaturated dicarboxylic acids such as maleic acid, fumaric acid, itaconic acid and citraconic acid, and anhydrides thereof (e.g. maleic anhydride, itaconic anhydride, etc.). These carboxy group-containing monomers can be used singly as one species or in a combination of two species.

When using a monomer $m_B$, the ratio of monomer $m_B$ in the monomer composition is not particularly limited. The ratio of monomer $m_B$ can be, for instance, 0.05% by weight or higher, or typically suitably 0.1% by weight or higher. From the standpoint of the polymerization stability and dispersion stability, it is preferably 0.5% by weight or higher, or more preferably 1% by weight or higher. From the standpoint of inhibiting an excessive increase in peel strength (adhesive strength), the ratio of monomer $m_B$ is suitably about 20% by weight or lower (preferably about 10% by weight or lower, typically about 7% by weight or lower), more preferably about 5% by weight or lower, or yet more preferably about 4% by weight or lower (e.g. 3% by weight or lower). From the standpoint of inhibiting erosion of a Low-E glass plate as the object to be protected, the usage of carboxy group-containing monomer is preferably limited.

In the acrylic polymer in the art disclosed herein, for purposes such as adjusting the glass transition temperature (Tg) of the acrylic polymer, an alkyl (meth)acrylate (or a monomer $m_C$, hereinafter) may be copolymerized as the monomer A, the alkyl (meth)acrylate having 4 to 20 alkyl carbon atoms and having a homopolymer Tg of −50° C. or higher. Here, a monomer belonging to the monomer $m_A$ is not categorized as a monomer $m_C$. For the monomer $m_C$, solely one species or a combination of two or more species can be used. A preferable monomer $m_C$ has a homopolymer Tg in the range between −40° C. and +60° C. and a more preferable monomer $m_C$ in the range between −30° C. and +40° C. (e.g. between −20° C. and +30° C.). Non-limiting examples of a monomer $m_C$ that can be preferably used include n-butyl methacrylate (BMA), 2-ethylhexyl methacrylate and lauryl acrylate.

When using a monomer $m_C$, the ratio of monomer $m_C$ in the monomer composition is not particularly limited. The ratio of monomer $m_C$ can be, for instance, 1% by weight or higher, 5% by weight or higher, 10% by weight or higher, or even 15% by weight or higher. In some embodiments, from the standpoint of obtaining greater effect of monomer $m_C$, the ratio of monomer $m_C$ in the monomer composition can also be 20% by weight or higher, 25% by weight or higher, 30% by weight or higher, or even 35% by weight or higher (e.g. 40% by weight or higher). The ratio of monomer $m_C$ in the monomer composition can be below 60% by weight. From the standpoint of the flexibility and enhanced low temperature properties, it is suitably about 55% by weight or lower (typically about 50% by weight or lower, e.g. about 45% by weight or lower). In some embodiments, the ratio of monomer $m_C$ can be below 30% by weight, below 20% by weight, or even below 10% by weight (e.g. below 5% by weight, or even below 1% by weight).

In the acrylic polymer in the art disclosed herein, as necessary, other monomer(s) (monomer $m_D$) can be copolymerized as the monomer A besides monomers $m_A$, $m_B$ and $m_C$. As the monomer $m_D$, among various monomers copolymerizable with monomer $m_A$, solely one species or a combination of two or more species can be used.

As the monomer $m_D$, for instance, it is possible to use an alkyl (meth)acrylate (monomer $m_{D1}$) represented by the formula (1) shown earlier (while excluding any species considered a monomer $m_A$ or monomer $m_C$). Specific examples of the alkyl (meth)acrylate that can be used as monomer $m_{D1}$ include methyl (meth)acrylate, ethyl (meth)acrylate and propyl (meth)acrylate. For the monomer $m_{D1}$, solely one species or a combination of two or more species can be used.

Examples of compounds that can be used as the monomer $m_D$ may include a functional group-containing monomer (monomer B) such as those described below. These functional group-containing monomers may be useful for introducing crosslinking points into the acrylic polymer or for increasing the cohesive strength of the acrylic polymer.

Hydroxy group-containing monomers: e.g. hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxyauryl (meth)acrylate and (4-hydroxymethylcyclohexyl)methyl acrylate; unsaturated alcohols such as vinyl alcohol and allyl alcohol.

Amide group-containing monomers: e.g. (meth)acrylamide, N,N-dimethyl (meth)acrylamide, N,N-diethyl (meth)acrylamide, N,N-dimethylaminopropyl (meth)acrylamide, N-butyl (meth)acrylamide, N-methylol (meth)acrylamide, N-methylolpropane (meth)acrylamide, N-methoxymethyl (meth)acrylamide, N-butoxymethyl (meth)acrylamide and diacetone (meth)acrylamide;

Imide group-containing monomers: e.g. N-isopropylmaleimide, N-cyclohexylmaleimide, itaconimide;

Amino group-containing monomers: e.g. aminoethyl (meth)acrylate, N,N-dimethylaminoethyl (meth)acrylate, N,N-dimethylaminopropyl (meth)acrylate, t-butylaminoethyl (meth)acrylate;

Epoxy group-containing monomers: e.g. glycidyl (meth)acrylate, methylglycidyl (meth)acrylate, allyl glycidyl ether;

Cyano group-containing monomers: e.g. acrylonitrile, methacrylonitrile; Keto group-containing monomers: e.g. diacetone (meth)acrylamide, diacetone (meth)acrylate, vinyl methyl ketone, vinyl ethyl ketone, allyl acetoacetate, vinyl acetoacetate;

Monomers having nitrogen atom-containing rings: e.g. N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, N-(meth)acryloyl morpholine, N-(meth)acryloylpyrrolidone; Alkoxysilyl group-containing monomers: e.g. (3-(meth)acryloxypropyl) trimethoxysilane, (3-(meth)acryloxypropyl)triethoxysilane, (3-(meth)acryloxypropyl)methyldimethoxysilane, (3-(meth)acryloxypropyl)methyldiethoxysilane.

Other examples of the compound that can be used as the monomer $m_B$ include vinyl ester-based monomers such as vinyl acetate and vinyl propionate; aromatic vinyl compounds such as styrene, substituted styrenes (α-methylstyrene, etc.) and vinyltoluene; non-aromatic ring-containing (meth)acrylates such as cyclohexyl (meth)acrylate, t-butylcyclohexyl (meth)acrylate, cyclopentyl di(meth)acrylate and isobornyl (meth)acrylate; aromatic ring-containing (meth)acrylates such as aryl (meth)acrylates (e.g. phenyl (meth)acrylate, benzyl (meth)acrylate), aryloxyalkyl (meth)acrylate (e.g. phenoxyethyl (meth)acrylate), arylalkyl (meth)acrylate (e.g. benzyl (meth)acrylate); olefinic monomers such as ethylene, propylene, isoprene, butadiene and isobutylene; chlorine-containing monomers such as vinyl chloride and vinylidene chloride; isocyanate group-containing monomers such as 2-(meth)acryloxyethylisocyanate; alkoxy group-containing monomers such as methoxymethyl (meth)acrylate and ethoxyethyl (meth)acrylate; vinyl ether-based monomers such as methyl vinyl ether, ethyl vinyl ether and isobutyl vinyl ether.

Yet other examples of the compound that can be used as the monomer $m_D$ include polyfunctional monomers. Specific examples of polyfunctional monomers include compounds having two or more (meth)acryloyl groups per molecule such as 1,6-hexanediol di(meth)acrylate, ethylene glycol di(meth)acrylate, pentaerythritol di(meth)acrylate, trimethylolpropane tri (meth)acrylate, dipentaerythritol hexa (meth)acrylate and methylene bisacrylamide. When using such a polyfunctional monomer, its amount used is not particularly limited. It is suitably 2% by weight or less (more preferably 1% by weight or less) of the total monomer content.

The monomer $m_D$ is used in an amount of no more than 40% by weight of the monomer composition, preferably no more than 20% by weight, or more preferably no more than 10% by weight. The monomer $m_D$ may not be used. The art disclosed herein can be preferably practiced in an embodiment where the amount of monomer $m_D$ used is 0% or more and below 5% by weight of the monomer composition. Here, that the amount of monomer $m_D$ used is 0% by weight means that no monomer $m_D$ is used at least intentionally.

The ratio of monomer A (alkyl (meth)acrylate) in the total monomer content can be, but is not particularly limited to, for instance, about 50% by weight or greater; it is suitably about 60% by weight or greater, preferably about 70% by weight or greater, more preferably about 80% by weight or greater, or yet more preferably about 85% by weight or greater. With the inclusion of the monomer A in a prescribed amount, a protective sheet having desirable adhesive properties can be favorably obtained. The art disclosed herein can be preferably implemented, for instance, in some embodiments where the monomer A content in the total monomer content is about 90% by weight or greater. In an embodiment, the monomer A content can be about 95% by weight or greater, or even about 97% by weight or greater. The PSA composition comprising such an acrylic polymer as the base polymer can be advantageous from the standpoint of the weatherability of the PSA layer formed therefrom (and also the protective sheet having the PSA layer). In an embodiment using a monomer A and a monomer B together, from the standpoint of suitably obtaining the effects of the monomer B, the monomer A content in the total monomer content can be, for instance, 99.9% by weight or less; it is preferably 99.5% by weight or less, more preferably 99% by weight or less, or about 97% by weight or less (e.g. 95% by weight or less).

When an aforementioned functional group-containing monomer is copolymerized in the acrylic polymer, the ratio of the functional group-containing monomer to all the monomers forming the acrylic polymer is preferably about 0.1% by weight or higher (typically about 0.5% by weight or higher, e.g. about 1% by weight or higher), and preferably about 40% by weight or lower (typically about 30% by weight or lower, e.g. about 20% by weight or lower). When a hydroxy group-containing monomer is copolymerized with the acrylic monomer, from the standpoint of obtaining desirable cohesive strength, the ratio of hydroxy group-containing monomers to the total monomer content is suitably about 0.001% by weight or higher (typically about 0.01% by weight or higher, e.g. about 0.1% by weight or higher), preferably about 1% by weight or higher, or more preferably about 3% by weight or higher; it is preferably about 10% by weight or lower (typically about 7% by weight or lower, e.g. about 5% by weight or lower).

(Rubber-Based Polymer)

In other preferable embodiments, the PSA layer can be a rubber-based PSA layer. Examples of the base polymer include natural rubber; styrene-butadiene rubber (SBR); polyisoprene; butene-based polymer comprising a butene (1-butene or cis- or trans-2-butene) and/or 2-methylpropene (isobutylene) as the primary monomer(s); A-B-A block copolymer rubber and a hydrogenation product thereof, e.g. styrene-butadiene-styrene block copolymer rubber (SBS), styrene-isoprene-styrene block copolymer (SIS), styrene-isobutylene-styrene block copolymer rubber (SIBS), styrene-vinyl-isoprene-styrene block copolymers (SVIS), hydrogenated SBS (styrene-ethylene/butylene-styrene block copolymer (SEBS)), and hydrogenated SIS (styrene ethylene-propylene-styrene block copolymers (SEPS)). These rubber-based polymers can be used singly as one species or in a combination of two or more species.

(Tg of Base Polymer)

The Tg value of the PSA layer's base polymer (an acrylic polymer in case of an acrylic PSA layer being used) is not particularly limited in Tg. The Tg of the base polymer can be, for instance, about 0° C. or lower. In some preferable embodiments, the base polymer of the PSA layer has a Tg of about −5° C. or lower. According to a base polymer having such a Tg, a PSA layer that tightly adheres to adherend can be favorably formed. In an embodiment where the base polymer has a Tg of about −15° C. or lower (more preferably about −20° C. or lower, e.g. about −25° C. or lower), greater effects can be obtained. In another preferable embodiment, from the standpoint of the adhesion to adherends, the base polymer of the PSA layer has a Tg of about −35° C. or lower, more preferably about −40° C. or lower, or yet more preferably about −45° C. or lower (e.g. below-50° C., even about −52° C. or lower, or about −55° C. or lower). The Tg of the base polymer is suitably −70° C. or higher. From the standpoint of the cohesion of the PSA, etc., it is preferably about −65° C. or higher, more preferably −60° C. or higher, yet more preferably about −55° C. or higher (e.g. about −50° C. or higher), or possibly even about −35° C. or higher. The base polymer's Tg can be adjusted by suitably changing the monomer composition (i.e. the monomer species used in the synthesis of the polymer and their ratio).

In the present description, the Tg of a polymer refers to the value determined by the Fox equation based on the Tg values of homopolymers of the respective monomers forming the polymer and the weight fractions (copolymerization ratio by weight) of the monomers. As shown below, the Fox equation is a relational expression between the Tg of a copolymer and glass transition temperatures Tgi of homopolymers of the respective monomers constituting the copolymer.

$1/Tg=\Sigma(Wi/Tgi)$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

For the glass transition temperatures of homopolymers used for determining the Tg, the values found in known documents are used. For instance, with respect to the monomers listed below, for the glass transition temperatures of their homopolymers, the following values are used:

2-ethylhexyl acrylate −70° C.
n-hexyl acrylate −65° C.
n-octylacrylate −65° C.
isononyl acrylate −60° C.
n-nonyl acrylate −58° C.
n-butyl acrylate −55° C.
ethyl acrylate −20° C.
lauryl acrylate 0° C.
2-ethylhexyl methacrylate −10° C.
methyl acrylate 8° C.
n-butyl methacrylate 20° C.
methyl methacrylate 105° C.
acrylic acid 106° C.
methacrylic acid 228° C.
styrene 32° C.
vinyl acetate 100° C.

With respect to the Tg values of homopolymers other than the examples listed above, the values given in *Polymer Handbook* (3rd edition, John Wiley & Sons, Inc., Year 1989) are used. With respect to a monomer for which two or more values are listed in the *Polymer Handbook*, the highest value is used. When no values are given in the *Polymer Handbook*, values obtained by the measurement method described in Japanese Patent Application Publication No. 2007-51271 are used.

(Synthesis of Base Polymer)

The method for obtaining the base polymer (e.g. an acrylic polymer) is not particularly limited. Known polymerization methods can be suitably employed, such as solution polymerization, emulsion polymerization, bulk polymerization, and suspension polymerization. Alternatively, it is also possible to employ photopolymerization involving irradiation of light such as UV (typically carried out in the presence of a photopolymerization initiator) and active energy ray irradiation polymerization such as radiation polymerization involving irradiation of radioactive rays such as B rays and y rays. In some preferable embodiments, the base polymer (e.g. acrylic polymer) is obtained by emulsion polymerization of a starting monomer mixture having an aforementioned composition. As the monomer supply method in, for instance, emulsion polymerization, a suitable method can be employed among the all-at-once method where all the starting monomer mixture is supplied in one portion, gradual supply method, portion-wise supply method, etc. An emulsion of some or all of the monomers pre-mixed with water and a surfactant can be supplied to the polymerization vessel.

The polymerization temperature can be suitably selected in accordance with the monomer species, the solvent species, and the polymerization initiator species used, etc. The polymerization temperature is suitably about 20° C. or higher, preferably about 40° C. or higher, more preferably about 50° C. or higher; it can also be about 60° C. or higher, about 65° C. or higher, or even about 70° C. or higher. The polymerization temperature is suitably about 170° C. or lower (typically about 140° C. or lower), or preferably about 95° C. or lower (e.g. about 85° C. or lower). In emulsion polymerization, the polymerization temperature is preferably about 95° C. or lower (e.g. about 85° C. or lower).

The solvent (polymerization solvent) used for solution polymerization can be suitably selected among heretofore known organic solvents. For instance, aromatic compounds (typically aromatic hydrocarbons) such as toluene, acetic acid esters such as ethyl acetates, aliphatic and alicyclic hydrocarbons such as hexane and cyclohexane are preferably used.

Examples of the polymerization initiator include, but not limited to, azo-based initiators, peroxide-based initiators and redox-based initiators by the combination of a peroxide and a reducing agent. For the polymerization initiator, solely one species or a combination of two or more species can be used.

Examples of azo-based initiators include 2,2'-azobisisobutyronitrile, 2,2'-azobis[N-(2-carboxyethyl)-2-methylpropionamidine] hydrate, 2,2'-azobis(2-methylpropionamidine) disulfate salt, 2,2'-azobis(2-methylpropionamidine) dihydrochloride, 2,2'-azobis[2-(5-methyl-2-imidazolin-2-yl) propane] dihydrochloride and 2,2'-azobis(N,N'-dimethylene isobutylamidine) dihydrochloride.

Examples of the peroxide-based initiator include persulfates such as potassium persulfate and ammonium persulfate; benzoyl peroxide, t-butyl hydroperoxide, di-t-butyl peroxide, dicumyl peroxide, dilauroyl peroxide, di-n-octanoyl peroxide, di(4-methylbenzoyl) peroxide, t-butyl peroxybenzoate, t-butyl peroxyisobutyrate, t-hexyl peroxypivalate, t-butyl peroxypivalate, di(2-ethylhexyl) peroxydicarbonate, di(4-t-butylcyclohexyl) peroxydicarbonate, di-sec-butyl peroxydicarbonate, t-butyl peroxyneodecanoate, 1,1,3,3-tetramethyl butylperoxy-2-ethylhexanoate, 1,1-bis(t-butylperoxy)-3,3,5-trimethylcyclohexane, 1,1-bis(t-butylperoxy)cyclododecane, 1,1-bis(t-hexylperoxy) cyclohexane and hydrogen peroxide.

Examples of the redox-based initiator include a combination of a peroxide and ascorbic acid (combination of hydrogen peroxide and ascorbic acid, etc.), a combination of a peroxide and an iron (II) salt (combination of hydrogen peroxide and an iron (II) salt, etc.), and a combination of a persulfate salt and sodium hydrogen sulfite.

The polymerization initiator can be used in an amount suitably selected in accordance with the type of initiator, monomer species (monomer composition), polymerization conditions, etc. The amount of polymerization initiator used is, for instance, about 0.0005 part to 1 part by weight to 100 parts by weight of the starting monomers; and it is suitably in the range between about 0.001 part and 0.5 part by weight; preferably in the range between 0.002 part and 0.3 part by weight; and more preferably in the range between 0.005 part and 0.1 part by weight.

In the emulsion polymerization, as necessary, various heretofore known chain transfer agents (which can be considered also as a molecular weight-adjusting agent or polymerization degree-adjusting agent) can be used. For the chain transfer agent, solely one species or a combination of two or more species can be used. As the chain transfer agent, mercaptans can be preferably used, such as n-dodecyl mercaptan, t-dodecyl mercaptan, glycidyl mercaptan, 2-mercaptoethanol, mercaptoacetic acid, thioglycolic acid, 2-ethylhexyl thioglycolate and 2,3-dimercapto-1-propanol. When using a chain transfer agent, its amount used to 100 parts by weight of the total monomer content is, for instance, possibly about 0.01 to 1 part by weight, preferably 0.02 to 0.1 part by weight, or more preferably 0.03 to 0.07 part by weight. The art disclosed herein can be preferably practiced in an embodiment without the use of a chain transfer agent.

The surfactant (emulsifier) used in emulsion polymerization is not particularly limited. Commonly-known anionic surfactants, nonionic surfactants and the like can be used. A surfactant having a radically polymerizable functional group can also be used. Hereinafter, the surfactant having a radically polymerizable functional group is referred to as a reactive (polymerizing) surfactant. In contrast to this, a general surfactant free of a radically polymerizable functional group may be referred to as a non-reactive (non-polymerizing) surfactant. For the surfactant, solely one species or a combination of two or more species can be used.

Examples of the non reactive surfactant include anionic emulsifiers such as sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates; and non-ionic emulsifiers such as polyoxyethylene alkyl ethers, polyoxyethylene alkyl phenyl ethers, polyoxyethylene aliphatic acid esters, and polyoxyethylene-polyoxypropylene block polymers.

The reactive surfactant is not particularly limited as far as it has a radically polymerizable functional group. For instance, the reactive surfactant may have a structure such that a radically polymerizable functional group is incorporated in an aforementioned anionic surfactant or nonionic surfactant. Examples of the radically polymerizable functional group include vinyl group, propenyl group, isopropenyl group, vinyl ether group (vinyloxy group), and allyl ether group (allyloxy group). The concept of propenyl group referred to herein encompasses 1-propenyl group ($CH_3$—

CH=CH—) and 2-propenyl group (CH$_2$=CH—CH$_2$— which may be called allyl group).

Examples of an anionic reactive surfactant include polyoxyethylene (allyloxymethyl) alkyl ether sulfates (e.g. ammonium salts), polyoxyethylene nonyl propenyl phenyl ether sulfates (e.g. ammonium salts), alkyl allyl sulfosuccinates (e.g. sodium salts), methacryloxy polyoxypropylene sulfuric acid ester salts (e.g. sodium salts), and polyoxyalkylene alkenyl ether sulfates (e.g. an ammonium salt having an isopropenyl group as the terminal alkenyl group). When the anionic reactive surfactant is forming a salt, the salt can be, for instance, a metal salt such as sodium salt or a non-metal salt such as ammonium salt and amine salt.

Examples of a nonionic reactive surfactant include polyoxyethylene nonyl propenyl phenyl ether.

Although no particular limitations are imposed, in some embodiments, a reactive surfactant having an oxyethylene chain can be preferably used. The oxyethylene chain refers to a structure of repeating oxyethylene units, that is, a structural moiety represented by —(C$_2$H$_4$O)$_n$—, with n indicating the number of repeats of the oxyethylene unit. For instance, in a preferable reactive surfactant, the number of repeats, n, is about 5 to 30 (e.g. 8 to 25).

From the standpoint of the polymerization stability during the emulsion polymerization, in some embodiments, it is preferable to use a reactive surfactant having a propenyl group. A preferable reactive surfactant has a propenyl group and also an oxyethylene chain.

From the standpoint of the emulsifying ability, etc., in some embodiments, an anionic reactive surfactant (e.g. an anionic reactive surfactant having an oxyethylene chain) can be preferably used. When the anionic reactive surfactant is in a salt form, as the salt, a non metal salt is preferable. In particular, an ammonium salt is preferable.

When using a nonionic reactive surfactant, more favorable results can be obtained by the combined use with other surfactant(s), such as an anionic reactive surfactant, anionic non reactive surfactant and nonionic non-reactive surfactant.

By carrying out emulsion polymerization of the starting monomer mixture in the presence of a reactive surfactant having a radically polymerizable functional group, the reactive surfactant may undergo a reaction to be incorporated into the base polymer (e.g. acrylic polymer). The reactive surfactant incorporated in the base polymer is less likely to bleed out to the PSA layer surface because its move within the PSA layer is limited. Accordingly, the use of the reactive surfactant can reduce bleed-out of a low molecular weight compound to the PSA layer surface. This is preferable from the standpoint of the low-contaminating properties. From the standpoint of obtaining greater low-contaminating properties, it is preferable to apply an embodiment using solely a reactive surfactant as the surfactant for emulsion polymerization.

The amount of surfactant used is preferably about 0.1 part by weight or greater (e.g. about 0.5 part by weight or greater) to 100 parts by weight of the total monomer content; and it is suitably about 10 parts by weight or less (e.g. about 5 parts by weight or less) or possibly about 4 parts by weight or less to 100 parts by weight of the total monomer content. From the standpoint of the adhesive properties, lower possibilities of adherend surface contamination, etc., the amount of non reactive surfactant used to 100 parts by weight of the total monomer content is about 5 parts by weight or less, suitably about 4 parts by weight or less, or preferably about 3 parts by weight or less (e.g. about 2 parts by weight or less).

The PSA layer of the protective sheet disclosed herein can be formed from various forms of PSA compositions. Examples of forms of the PSA composition include a solvent-based PSA composition containing the PSA (adhesive component(s)) in an organic solvent, a water-dispersed PSA composition containing at least part of the PSA dispersed in an aqueous solvent, an active energy ray curable PSA composition formulated so as to cure with active energy rays such as UV rays and radioactive rays to form PSA, and a hot-melt PSA composition which is applied in the molten state by heating and forms PSA when it cools to near room temperature.

From the standpoint of reducing environmental stress, a water dispersed PSA composition can be preferably selected. A favorable example of the water dispersed PSA composition is a water dispersed PSA composition (water-dispersed acrylic PSA composition, typically an emulsion-based acrylic PSA composition) comprising an acrylic polymer as the base polymer. From the standpoint of the adhesive properties, a solvent-based PSA composition is preferable. A hot-melt PSA composition which does not require the use of solvent is advantageous for having excellent handling properties in manufacturing processes.

(Crosslinking Agent)

In the art disclosed herein, the PSA composition used to form the PSA layer preferably comprises a crosslinking agent. The PSA layer formed from a PSA composition comprising a base polymer and a crosslinking agent typically comprises a polymer (base polymer) crosslinked with the crosslinking agent. According to such a PSA layer, the surface hardness of the PSA layer can be suitably adjusted and good aged removability is readily obtained. The type of crosslinking agent used is not particularly limited and can be suitably selected from heretofore known crosslinking agents.

Specific examples of the crosslinking agent include oxazoline-based crosslinking agents, aziridine-based crosslinking agents, isocyanate-based crosslinking agents, epoxy-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents, amine-based crosslinking agents, and silane coupling agents. These can be used solely as one species or in a combination of two or more species. For instance, it is preferable to use one, two or more species selected from a group consisting of oxazoline-based crosslinking agents, aziridine-based crosslinking agents, isocyanate-based crosslinking agents and epoxy-based crosslinking agents. In particular, oxazoline-based crosslinking agent, isocyanate-based crosslinking agent and epoxy-based crosslinking agent are more preferable. In an embodiment using a water dispersed PSA composition, a preferable crosslinking agent is soluble or dispersible in water and a particularly preferable crosslinking agent is soluble in water (i.e. water-soluble).

As the oxazoline-based crosslinking agent, a species having one or more oxazoline groups per molecule can be used without particular limitations. In the water-dispersed PSA composition, it is preferable to use an oxazoline-based crosslinking agent that is soluble or dispersible in water (an aqueously soluble or aqueously dispersible oxazoline-based crosslinking agent).

The oxazoline group can be either 2-oxazoling group, 3-oxazoline group or 4-oxazoline group. A 2-oxazoline group-containing oxazoline-based crosslinking agent can be preferably used. As the oxazoline-based crosslinking agent, a water-soluble copolymer or a water-dispersed copolymer can be used, which is obtained by copolymerizing an addition-polymerizable oxazoline such as 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline and 2-isopropenyl-5-ethyl-2-oxazoline with other monomer(s). Examples of a commercial oxazoline-based crosslinking agent include products of Nippon Shokubai Co., Ltd., under trade names EPOCROS WS-500, EPOCROS WS-700, EPOCROS K-2010E, EPOCROS K-2020E and EPOCROS K-2030E.

Examples of the aziridine-based crosslinking agent include trimethylolpropane tris[3-(1-aziridinyl) propionate] and trimethylolpropane tris[3-(1-(2-methyl)aziridinylpropionate)]. Examples of commercial aziridine-based crosslinking agent include product names CHEMITITE PZ-33 and CHEMITITE DZ-22E available from Nippon Shokubai Co., Ltd.

As an example of the isocyanate-based crosslinking agent, a bifunctional or higher polyfunctional isocyanate compound can be used. Examples include aromatic isocyanates such as tolylene diisocyanates, xylylene diisocyanate, polymethylene polyphenyl diisocyanate, tris(p-isocyanatophenyl)thiophosphate, and diphenylmethane diisocyanate; alicyclic isocyanates such as isophorone diisocyanate; and aliphatic isocyanates such as hexamethylene diisocyanate. Commercial products include isocyanate adducts such as trimethylolpropane/tolylene diisocyanate trimer adduct (trade name CORONATE L available from Tosoh Corporation), trimethylolpropane/hexamethylene diisocyanate trimer adduct (trade name CORONATE HL available from Tosoh Corporation) and hexamethylene diisocyanate isocyanurate (trade name CORONATE HX available from Tosoh Corporation). In the water-dispersed PSA composition, it is preferable to use a water-soluble or water-dispersible isocyanate-based crosslinking agent. For instance, a water soluble, water dispersible or self-emulsifying isocyanate-based crosslinking agent can be preferably used. A so-called blocked isocyanate-based crosslinking agent can be preferably used as an isocyanate-based crosslinking agent.

As the epoxy-based crosslinking agent, a species having two or more epoxy groups per molecule can be used without particular limitations. An epoxy-based crosslinking agent having 3 to 5 epoxy groups per molecule is preferable. In the water-dispersed PSA composition, it is preferable to use a water-soluble or water-dispersible epoxy-based crosslinking agent.

Specific examples of the epoxy-based crosslinking agent include N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether.

Commercial epoxy-based crosslinking agents include products of Mitsubishi Gas Chemical Co., Inc., under trade names TETRAD-X and TETRAD-C, a product of DIC Corporation under trade name EPICLON CR-5L, a product of Nagase ChemteX Corporation under trade name DENA-COL EX-512, and a product of Nissan Chemical Industries, Ltd., under trade name TEPIC-G.

As the carbodiimide-based crosslinking agent, a low or high molecular weight compound having two or more carbodiimide groups can be used. In a water-dispersed PSA composition, it is preferable to use a water-soluble or water-dispersible carbodiimide-based crosslinking agent. Examples of commercial carbodiimide-based crosslinking agents include the CARBODILITE series such as the CARBODILITE V series (aqueous solutions) including CARBODILITE V-02, CARBODILITE V-02-L2, and CARBODILITE V-04; and the CARBODILITE E series (aqueous dispersions) including CARBODILITE E-01, CARBODILITE E-02, and CARBODILITE E-04 available from Nisshinbo Holdings, Inc.

The crosslinking agent content (the total amount of crosslinking agent) in the PSA composition disclosed herein is not particularly limited and can be suitably selected in view of the composition and the molecular weight of the base polymer so as to obtain favorable properties after crosslinked. While no particular limitations are imposed, the amount of the crosslinking agent used to 100 parts by weight of the base polymer (typically an acrylic polymer) is about 0.01 part by weight or greater, suitably about 0.1 part by weight or greater, or preferably about 1 part by weight or greater (e.g. about 2 parts by weight or greater). From the standpoint of the adhesion, etc., the amount of the crosslinking agent is suitably about 15 parts by weight or less (preferably about 10 parts by weight or less, e.g. about 5 parts by weight or less) to 100 parts by weight of the base polymer. From the standpoint of increasing the tightness of adhesion to adherends, it is preferably about 4 parts by weight or less, more preferably less than 3.5 parts by weight, or yet more preferably less than 3 parts by weight.

(Phosphate)

The PSA composition (and also the PSA layer) disclosed herein may include a phosphate. Examples of the phosphate include alkyl phosphates such as lauryl phosphate and a lauryl phosphate salt; and a phosphate having an oxyethylene chain and a salt thereof. The salt can be, for instance, sodium salts, potassium salts, barium salts and triethanolamine salts of these phosphates. In the following, unless otherwise noted, the "phosphate" includes a salt. In particular, it is more preferable to use a phosphate having an oxyethylene chain. The oxyethylene chain containing phosphate can suppress the increase in adhesive strength with aging (i.e. increase the stability of the adhesive strength) while preventing penetration of corrosion-induced components such as water, an acid and a base at the interface between the PSA layer and the adherend surface. Here, the oxyethylene chain refers to a structural moiety in chain form that includes at least one ethylene oxide (EO) unit and may further include other oxyalkylene unit(s) (e.g. oxyalkylene unit(s) with about 3 to 6 carbon atoms). One favorable example of the oxyethylene chain containing phosphate is a phosphate having an oxyethylene chain formed with an EO unit or repeats of this. For instance, a phosphate represented by the next general formula (a) or a salt thereof can be preferably used.

[Chem 1]

(a)

In the general formula (a), $R^1$ is —OH or —(OCH$_2$CH$_2$)$_n$OR$^3$; $R^2$ represents —(OCH$_2$CH$_2$)$_m$OR$^4$; n and m indicate the number of moles of EO added. The number of moles of EO added, n, is an integer between 1 and 30; it can be typically an integer between about 1 and 20, preferably an integer between about 1 and 10, for instance, an integer between about 1 and 8. The number of moles of EO added, n, is preferably an integer between about 1 and 6, or yet more preferably an integer between 1 and 4 (e.g. 2 and 4). In the general formula (a), the number of moles of EO added, m, can be typically about the same as the number of moles of EO added for n; n and m may be identical or different. $R^3$ and $R^4$ are mono valent organic groups (typically hydrocarbon groups); for instance, each can be individually a group selected among an alkyl group, cycloalkyl group, aryl group, alkylaryl group, and arylalkyl group. $R^3$ and $R^4$ are preferably linear or branched alkyl groups, aryl groups or alkylaryl groups. $R^3$ and $R^4$ are individually an organic group with 1 to 30 carbon atoms, or possibly an organic group with 6 or more (preferably 8 or more, e.g., 11 or more) carbon atoms. In some preferable embodiments, $R^3$ and $R^4$ can be organic groups with 20 or fewer or preferably 18 or fewer, for instance, 15 or fewer carbon atoms. The phosphate salts represented by the general formula (a) can be, for instance, sodium salts, potassium salts, barium salts and triethanolamine salts of these phosphates. For the phosphate, solely one species or a combination of two or more species can be used.

Examples of the phosphates include polyoxyethylene alkylphosphoric acid esters such as polyoxyethylene tridecyl ether phosphate, polyoxyethylene lauryl ether phosphate, and polyoxyethylene octadecyl ether phosphate; and polyoxyethylene alkyl aryl phosphoric acid esters such as polyoxyethylene nonyl phenyl ether phosphate, polyoxyethylene octyl phenyl ether phosphate, polyoxyethylene dinonyl phenyl ether phosphate, and polyoxyethylene dioctyl phenyl ether phosphate. In some embodiments, a phosphoric acid ester having a molecular weight of 150 to 5000 can be preferably used.

The amount of phosphate used can be, for instance, about 0.05 part by weight or greater to 100 parts by weight of the base polymer (e.g. an acrylic polymer); it is usually preferably about 0.1 part by weight or greater, or more preferably about 0.3 part by weight or greater (e.g. about 0.5 part by weight or greater). From the standpoint of leaving a lower degree of contamination on the adherend surface, the amount of phosphate used to 100 parts by weight of the base polymer (e.g. an acrylic polymer) is suitably about 5 parts by weight or less (e.g. 3 parts by weight or less), preferably about 2 parts by weight or less, or more preferably about 1 part by weight or less (e.g. 0.1 part by weight or less). The art disclosed herein can be preferably implemented in an embodiment where the PSA layer is essentially free of phosphates. According to the PSA layer free of phosphates or limited in phosphate content, adherend surface contamination is highly inhibited.

(Rust Inhibitor)

The PSA layer disclosed herein may or may not comprise a rust inhibitor. The PSA layer according to some preferable embodiments may include a rust inhibitor. The rust inhibitor is not particularly limited and a suitable species is selected for its anti-rust effect relative to the adherend. Examples of the rust inhibitor include amine compounds (e.g. amine salts of organic and inorganic acids, triethanolamine, aliphatic acid-based amine compounds, alicyclic amines (in particular, polyoxyalkylene-containing alicyclic amines)), azole-based compounds (triazole-based compounds, etc.), nitrites, ammonium benzoate, ammonium phthalate, ammonium stearate, ammonium palmitate, ammonium oleate, ammonium carbonate, dicyclohexylaminebenzoic acid salts, urea, urotropin, thiourea, phenyl carbamate, and cyclohexylammonium-N-cyclohexyl carbamate (CHC). These rust inhibitors can be used singly as one species or in a combination of two or more species. Among them, amine-based compounds and azole-based compounds are preferable. The species of rust inhibitor is desirably selected in view of influences on the adhesive properties (e.g. possibilities to impair crosslinking reactions, etc.).

The amount of rust inhibitor (e.g. an amine-based compound (amine-based rust inhibitor) or an azole-based compound (azole-based rust inhibitor) is not particularly limited. It can be, for instance, 0.01% by weight or greater (typically 0.05% by weight or greater) of the PSA layer. From the standpoint of obtaining greater anti-corrosion effects, the amount may be 0.1% by weight or greater, 0.3% by weight or greater, even 0.5% by weight or greater, 1% by weight or greater, 1.5% by weight or greater, or even 2% by weight or greater (e.g. 2.5% by weight or greater). On the other hand, the rust inhibitor content is suitably below 5% by weight of the PSA layer. In some preferable embodiments, the rust inhibitor content of the PSA layer is 3% by weight or less. By limiting the usage of rust inhibitor to or below the prescribed values, good removability can be preferably maintained while inhibiting the increase in aged adhesive strength. The rust inhibitor content of the PSA layer is more preferably about 2% by weight or less, or possibly about 1.5% by weight or less (e.g. about 1.0% by weight or less). The art disclosed herein can be preferably implemented in an embodiment using essentially no rust inhibitor. According to the PSA layer free of rust inhibitor or limited in rust inhibitor content, adherend surface contamination can be highly inhibited. In an embodiment using a base polymer crosslinked with a crosslinking agent (e.g. an oxazoline-based crosslinking agent), from the standpoint of aged removability, it is particularly significant to limit the amount of rust inhibitor (e.g. an amine-based rust inhibitor) which may impair the crosslinking reaction of the crosslinking agent.

(Other Components, Etc.)

The PSA layer can comprise, as necessary, a known tackifier such as a rosin-based tackifier, terpene-based tackifier and hydrocarbon-based tackifier. From the standpoint of avoiding an excessive increase in peel strength, the amount of tackifier is preferably about 5 parts by weight or less to 100 parts by weight of the base polymer, or more preferably about 1 part by weight or less. For the protective sheet disclosed herein, the adhesive strength can be effectively controlled by the base polymer's composition and Tg as well as PSA's gel fraction, etc.; and therefore, the surface PSA sheet can be preferably made in an embodiment using no tackifier as well.

The PSA layer may comprise, as necessary, various optional additives generally known in the field of PSA compositions, such as viscosity-adjusting agent (viscosifier, etc.), crosslinking accelerator, plasticizer, softener, filler, anti-static agent, anti-aging agent, UV-absorber, antioxidant, photo-stabilizing agent and defoamer. In the PSA composition according to some embodiments, the amount of plasticizer such as aliphatic acid ester can be limited to, for instance, below 5 parts by weight (e.g. below 1 part by weight) to 100 parts by weight of base polymer. In typical, the PSA composition may be essentially free of a plasticizer. The art disclosed herein can be preferably implemented in an embodiment essentially free of an anti-static agent (possibly a conducting agent) such as an ionic compound (e.g. ionic liquid, alkaline metal salt). With respect to other matters about these various optional additives, various heretofore known additives and methods can be selected based on technical common knowledge. Because these additives do not characterize the present invention in particular, details are omitted.

In the art disclosed herein, in an embodiment using a water-dispersed PSA composition for PSA layer formation, the PSA composition can be prepared, for instance, by mixing an acrylic polymer dispersion in water obtained by emulsion polymerization using a surfactant with other components (e.g. crosslinking agent, etc.) used as necessary. The water dispersion may comprise the aqueous liquid described later. For instance, it is possible to use a polymerization reaction mixture obtained by emulsion polymerization or the polymerization reaction mixture subjected as necessary to a treatment such as pH adjustment (e.g. neutralization), non-volatile content adjustment and viscosity adjustment. In typical, the emulsion's dispersion stability can be increased by pH adjustment in a suitable range (e.g. in the range between about pH 6 and pH 9) with addition of a neutralizer such as ammonia water.

While no particular limitations are imposed, from the standpoint of efficient drying, etc., the non-volatile content (NV) of the PSA composition can be about 20% by weight or higher (typically about 30% by weight or higher, preferably about 40% by weight or higher). From the standpoint of the ease of application, etc., it can be about 75% by weight or lower (typically about 70% by weight or lower, preferably about 60% by weight or lower).

(Chloride Ion Amount)

In the PSA layer disclosed herein, the chloride ion amount determined by hot water extraction is not particularly limited. In some embodiments, the chloride ion amount per gram of PSA (layer) can be below 300 μg. According to the PSA layer having such a limited chloride ion amount, erosion in the Low-E glass plate to be protected tends to be prevented without adding an anti-corrosive component such as rust inhibitor or with a limited usage thereof. The chloride ion amount per gram of PSA (layer) is suitably about 250 μg or less, or possibly about 200 μg or less (e.g. about 150 μg or less). By limiting the chloride ion amount of the PSA contacting the Low-E glass plate, erosion in the Low-E glass plate is likely to be prevented for a long period in the resulting configuration. In some embodiments, the chloride ion amount per gram of PSA (layer) can also be about 100 μg or less, about 95 μg or less, about 90 μg or less, about 85 μg or less, or even about 75 μg or less (about 70 μg or less). The minimum chloride ion amount per gram of PSA (layer) is ideally 0 μg; however, from the standpoint of the productivity, allowable level for practical use, etc., it can be about 1 μg or greater, about 10 μg or greater, or even about 50 μg or greater. In other embodiments, the chloride ion amount per gram of PSA (layer) can also be about 70 μg or greater, or even about 100 μg or greater (e.g. about 120 μg or greater). According to the art disclosed herein, by adding a limited amount of rust inhibitor to the PSA layer having such a chloride ion amount, good anti-corrosive properties can be obtained without impairing the aged removability.

The chloride ion amount per gram of PSA (layer) is determined by the method described later in Examples. Alternatively, it can also be determined as follows: Chloride ions in the protective sheet and the substrate layer are quantified by hot water extraction; from the difference in chloride ion amount between the two, the chloride ion amount from the PSA layer is determined; and the resulting value is converted to a per unit PSA (layer) value.

(Gel Fraction)

The PSA layer disclosed herein is not particularly limited in weight fraction (gel fraction) of ethyl acetate-insoluble portion; and it can be about 40% or higher. In some embodiments, the gel fraction of the PSA layer is suitably about 50% or higher, preferably about 60% or higher, or more preferably about 70% or higher (e.g. about 80% or higher). The gel fraction of the PSA layer can be, for instance, about 90% or higher (e.g. about 95% or higher). With increasing gel fraction, the PSA's cohesion tends to increase while the aged adhesive strength tends to be reduced. The maximum gel fraction is theoretically 100%. In some embodiments, the gel fraction can be, for instance, about 98% or lower, or even about 92% or lower (e.g. about 85% or lower). The gel fraction can be adjusted through, for instance, the base polymer composition and its content (percentage), the base polymer's polymerization method and conditions, the base polymer's molecular weight, the use of crosslinking agent as well as its selected type and amount used if any, species of additives, etc. The gel fraction is determined by the method described below. The same method is used for the working examples described later.

(Degree of Swelling)

The degree of swelling of the PSA layer disclosed herein is not particularly limited. It can be about 30-fold or less. From the standpoint of the aged removability, etc., the degree of swelling is suitably about 25-fold or less, preferably about 22-fold or less, or more preferably about 20-fold or less, for instance, even about 18-fold or less. The minimum degree of swelling is theoretically 1-fold; it can be about 3-fold or greater, for instance, about 5-fold or greater. The degree of swelling can be adjusted through, for instance, the base polymer's composition and its content (percentage), the base polymer's polymerization method and conditions, the base polymer's molecular weight, the type pf crosslinking agent (inter-functional-group distance) and its amount used, species of additives, etc. The degree of swelling is determined by the method described below.

(Thickness of PSA Layer)

No particular limitations are imposed on the thickness of the PSA layer constituting the protective sheet disclosed herein. From the standpoint of preventing adhesive transfer to the adherend, the thickness of the PSA layer is about 50 μm or less, suitably about 30 μm or less, preferably about 15 μm or less, or more preferably about 8 μm or less (e.g. less than 6 μm). In other embodiments, from the standpoint of the ease of removal, etc., the thickness of the PSA layer is suitably about 5 μm or less, or possibly about 4 μm or less, for instance, 3 μm or less. From the standpoint of the adhesion, the thickness of the PSA layer is suitably about 0.5 μm or greater, preferably about 1 μm or greater, or more preferably greater than 2 μm. The thickness of the PSA layer may be greater than 3 μm, for instance, greater than 4 μm.

<Substrate Layer>

The protective sheet disclosed herein may include a substrate layer. As the substrate layer, resin film, a rubber sheet, a foam sheet, a composite of these, etc., can be used. Examples of the rubber sheet include natural rubber sheets and butyl rubber sheets. Examples of the foam sheet include polyurethane foam sheets, and polychloroprene rubber foam sheets.

The art disclosed herein can be preferably applied to a protective sheet wherein the substrate layer is resin film. The concept of "resin film" here refers to film typically obtained by molding a thin layer from a resin composition primarily comprising resin components as described below; it should be distinguished from so-called non-woven and woven fabrics. In other words, the concept of resin film excludes non-woven and woven fabrics. Preferable resin film is essentially not foamed. In other words, non-foamed resin film can be preferably used. Here, the non-foamed resin film refers to resin film that has not been deliberately subjected to a foaming process. In particular, the resin film may have an expansion ratio lower than about 1.1 (e.g. lower than 1.05, typically lower than 1.01).

Examples of the resin components forming the resin film include polyolefinic resins (polyethylene, polypropylene, ethylene-propylene copolymer, ethylene-vinyl acetate copolymer, etc.), poly(vinyl chloride)-based resins (typically soft poly(vinyl chloride)-based resin); poly(vinyl acetate)-based resin, polyurethane-based resins (ether-based polyurethane, ester-based polyurethane, carbonate-based polyurethane, etc.), urethane (meth)acrylate-based resin, thermoplastic elastomers (olefinic elastomer, styrene-based elastomer, acrylic elastomer, etc.), polyester-based resins (polyethylene terephthalate, polybutylene terephthalate, polyethylene naphthalate, polybutylene naphthalate, etc.), polycarbonate-based resin, polyamide-based resin, polyimide-based resin, fluororesin and cellulose-based resins such as cellophane resin. Among these resins, solely one species or a combination of two or more species can be used. Favorable examples of the resin film include polyolefinic resin film, polyester-based resin film and vinyl chloride-based resin film.

While no particular limitations are imposed, in the protective sheet according to some embodiments, it is preferable to use a substrate layer that comprises, as its primary component(s), one, two or more species of resin selected from the group consisting of polyolefinic resin, poly(vinyl chloride)-based resin, polyurethane-based resin, thermoplastic elastomer and polyester-based resin (typically a substrate layer comprising such resin in an amount exceeding 50% by weight). In other embodiments, in view of the performance, ease of handling, costs, etc., a substrate layer comprising a polyolefinic resin layer, polyester-based resin layer or polyvinyl chloride-based resin layer can be preferably used. Among the resin materials, in view of the heat stability, the lightness of weight, etc., polyolefinic resins, polyurethane-based resins and olefinic elastomers are preferable; in view of the handling properties, etc., polyolefinic resins and olefinic elastomers are particularly preferable.

The protective sheet disclosed herein can be preferably made in an embodiment comprising a substrate layer that comprises a polyolefinic resin as the primary component (e.g. more than 50% by weight), that is, an embodiment wherein the substrate layer is polyolefinic resin film. For instance, it is preferable to use polyolefinic resin film in which 50% by weight or more of the entire substrate layer is polyethylene (PE) resin or polypropylene (PP) resin. In other words, in the polyolefinic resin film, the combined amount of PE resin and PP resin may account for 50% by weight or more of the entire substrate layer. The polyolefinic resin film can be a blend of PE and PP resins.

The PP resin may comprise, as the primary component, various polymer species (propylene-based polymers) that comprise propylene as a monomer unit. The PP resin may be essentially formed of one, two or more species of propylene-based polymer. The concept of propylene-based polymer here includes homopolypropylene as well as a random copolymer of propylene and other monomer(s) (random polypropylene) and a block copolymer (block polypropylene). The concept of propylene-based polymer here includes, for instance, the following species:

Propylene homopolymer (homopolypropylene), for instance, isotactic polypropylene;

Random copolymer (random polypropylene) of propylene and other α-olefin(s) (typically, one, two or more species selected from ethylene and α olefins having 4 to 10 carbon atoms), preferably random polypropylene comprising propylene as the primary monomer (i.e. the monomer accounting for 50% by weight or more of the total monomer content);

Block copolymer (block polypropylene) of propylene and other α-olefin(s) (typically, one, two or more species selected from ethylene and α olefins having 4 to 10 carbon atoms), preferably block polypropylene comprising propylene as the primary monomer (i.e. the monomer accounting for 50% by weight or more of the total monomer content).

The PE resin may comprise, as the primary component, various types of polymer (ethylene-based polymer) comprising ethylene as a monomer. The PE resin may be essentially formed of one, two or more species of ethylene-based polymer. The ethylene-based polymer can be an ethylene homopolymer or a copolymer (random copolymer, block copolymer, etc.) of ethylene as the primary monomer and other α olefin(s) as secondary monomer(s). Favorable examples of the α olefins include α olefins having 3 to 10 carbon atoms such as propylene, 1-butene (which can be a branched 1-butene), 1-hexene, 4-methyl-1-pentene and 1-octene. For instance, it is preferable to use PE resin that comprises, as the primary component, an ethylene-based polymer in which an α olefin as the secondary monomer is copolymerized up to about 10% by weight (typically up to about 5% by weight).

The PE resin may comprise a copolymer of ethylene and a monomer (functional monomer) containing other functional group(s) in addition to a polymerizable functional group, copolymer of an ethylene-based polymer copolymerized with such a functional monomer, or the like. Examples of a copolymer of ethylene and a functional monomer include ethylene-vinyl acetate copolymers (EVA), ethylene-acrylic acid copolymers (EAA), ethylene methacrylic acid copolymers (EMAA), ethylene-methyl acrylate copolymers (EMA), ethylene-ethyl acrylate copolymers (EEA), ethylene-methyl methacrylate copolymers (EMMA), and copolymers of ethylene and (meth)acrylic acid (i.e. acrylic acid and/or methacrylic acid) crosslinked by metal ions.

The PE resin is not particularly limited in density. The concept of PE resin here includes all of the following: high density polyethylene (HDPE), medium density polyethylene (MDPE), low density polyethylene (LDPE) and linear low density polyethylene (LLPDE). In some embodiments, the density of the PE resin can be, for instance, about 0.90 g/cm$^3$ to 0.94 g/cm$^3$. Preferable PE resins include LDPE and LLDPE. The PE resin may comprise one, two or more species of LDPE and one, two or more species of LLDPE. There are no particular limitations to the respective blend ratios of LDPE and LLDPE, or to the LDPE to LLDPE blend ratio. They can be suitably selected to form a PE resin having desirable properties. As the substrate layer of the protective sheet disclosed herein, it is preferable to use polyethylenic resin film such as LLDPE film whose LLDPE content is higher than 50% by weight (preferably about 75% by weight or higher, e.g. about 90% by weight or higher) and LDPE film whose LDPE content is higher than 50% by weight (preferably about 75% by weight or higher, e.g. about 90% by weight or higher). Laminate resin film comprising such polyethylenic resin film as a component can be used as well.

The resin film (e.g. polyolefinic resin film) used as the substrate layer of the protective sheet disclosed herein may comprise, as necessary, suitable components allowable in the substrate layer. Examples of additives that can be suitably added include filler, colorant (pigment such as inorganic pigment, dye), antioxidant, photostabilizer (including radical scavenger and UV absorber), antistatic agent, plasticizer, slip agent, and anti-blocking agent. Each additive can be added, for instance, in an amount similar to a typical amount in the field of resin film used as substrate layers and the like of protective sheets.

The substrate layer may have a mono-layer structure or a multi-layer structure formed of two, three or more layers. In a multi-layer structure, it is preferable that at least one layer (preferably each layer) is formed of aforementioned resin film. For instance, in a preferable substrate layer, 75% or more (more preferably 90% or more) of the thickness is attributed to mono-layer or multi-layer (typically mono-layer) polyolefinic resin film. The substrate layer may be entirely formed of mono-layer or multi-layer polyolefinic resin film. From the standpoint of the cost-effectiveness, it is preferable to use a substrate layer formed of mono-layer resin film (e.g. LLDPE film, LDPE film, etc.).

The method for producing the substrate layer can be suitably selected among heretofore known methods and is not particularly limited. For instance, when resin film is used as the substrate layer, it is possible to use resin film fabricated by suitably employing a heretofore known general film-forming method such as inflation molding, extrusion, T-die cast molding, and calendar roll molding.

In an embodiment where at least one face (the PSA layer-side face) of the substrate layer is a resin film surface, the resin film surface can be subjected to a heretofore known surface treatment such as corona discharge treatment, plasma treatment, ozone exposure, flame exposure, UV irradiation, acid treatment, alkali treatment, and primer coating. These surface treatments may enhance the tightness of adhesion between the substrate layer and the PSA layer, or the anchoring of the PSA layer onto the substrate layer. In an embodiment using polyolefinic resin film as the substrate layer, it is particularly meaningful to provide these surface treatments.

The thickness of the substrate layer constituting the protective sheet disclosed herein is not particularly limited. The thickness of the substrate layer can be, for instance, about 800 µm or less (typically about 250 µm or less). In an embodiment, the thickness of the substrate layer (typically, non foamed resin film) is preferably about 150 µm or less, more preferably about 100 µm or less, or yet more preferably less than 65 µm, for instance, less than 55 µm. With decreasing thickness of the substrate layer, the protective sheet tends to exhibit greater conformability to the adherend shape while its lifting and peeling tend to be inhibited. From the standpoint of adherend protection and handling properties, etc., the thickness of the substrate layer can be typically about 10 µm or greater, preferably about 25 µm or greater, more preferably greater than about 30 µm, or yet more preferably greater than 40 µm, or possibly, for instance, greater than 45 µm.

<Properties of Protective Sheet>
(Chloride Ion Amount)

While no particular limitations are imposed, the protective sheet disclosed herein suitably has a chloride ion amount of less than 30 µg (e.g. about 25 µg or less, or even about 20 µg or less) per gram of protective sheet, determined by hot water extraction. The protective sheet with such a limited chloride ion amount can help obtain a configuration to prolongedly prevent erosion in a Low-E glass plate to be protected without adding an anti corrosive such as rust inhibitor or while limiting its usage. The chloride ion amount per gram of protective sheet is preferably below 15 µg, more preferably below 12 µg, or yet more preferably below 10 µg. In some preferable embodiments, the chloride ion amount determined by hot water extraction is below 8.9 µg (e.g. about 8.5 µg or less) per gram of protective sheet per gram of protective sheet. In some embodiments, the chloride ion amount per gram of protective sheet is preferably below 8.0 µg, more preferably below 7.0 µg, yet more preferably below 6.5 µg, or particularly preferably below 6.0 µg (e.g. below 5.5 µg). The minimum chloride ion amount per gram of protective sheet is ideally 0 µg; however, from the standpoint of the productivity, allowable level for practical use, etc., it can be about 1 µg or greater, about 3 µg or greater, or even about 5 µg or greater. In other embodiments, the chloride ion amount can be about 8 µg or greater, or even about 12 µg or greater. According to the art disclosed herein, by using a limited amount of rust inhibitor to the protective sheet having such a chloride ion amount, good anti-corrosive properties can be obtained without impairing the aged removability. The chloride ion amount per gram of protective sheet is determined by the method described later in Examples.

(Initial to-Glass Adhesive Strength)

The protective sheet disclosed herein suitably has an initial peel strength (initial to-glass adhesive strength) of 0.01 N/20 mm or greater, determined at a tensile speed of 0.3 m/min at a peel angle of 180° at 30 minutes after applied to a Low-E glass plate. In some embodiments, the initial peel strength can be about 0.05 N/20 mm or greater (e.g. about 0.1 N/20 mm or greater). In some preferable embodiments, the initial peel strength can be about 0.5 N/20 mm or greater (e.g. about 1 N/20 mm or greater), or even about 1.5 N/20 mm or greater. The PSA sheet having such an initial peel strength can bond well to an adherend in relatively short time after applied to the adherend and be less susceptible to the sort of lifting and peeling from the adherend, whereby good protective properties can be obtained. The maximum initial peel strength is not particularly limited. From the standpoint of light-peel properties, it is suitably about 5 N/20 mm or less, preferably about 3.3 N/20 mm or less, or more preferably about 2.5 N/20 mm or less (e.g. about 2 N/20 mm or less). The initial peel strength is determined by the method described later in Examples.

(Aged to-Glass Adhesive Strength)

The PSA sheet disclosed herein preferably has an aged peel strength (aged to-glass adhesive strength) of 3.3 N/20 mm or less, determined at a tensile speed of 0.3 m/min at a peel angle of 180° after applied to a Low-E glass plate and stored at 50° C. for 7 days. With the protective sheet satisfying this property, even when it is applied to the adherend for a relatively long time, the aged adhesive strength is sufficiently suppressed and its light peel from adherend can be maintained. Thus, it shows excellent efficiency for removal from the adherend. According to the protective sheet having an aged peel strength of about 3.0 N/20 mm or less (more preferably about 2.4 N/20 mm or less, or yet more preferably about 2.1 N/20 mm or less), greater removal efficiency (aged removability) can be obtained. From the standpoint of inhibiting lifting and peeling while protecting the adherend (e.g. while processing the adherend on which the protective sheet is adhered), the aged peel strength is suitably about 0.05 N/20 mm or greater, preferably about 0.1 N/20 mm or greater, or more preferably about 0.3 N/20 mm or greater. The aged peel strength can also be about 1 N/20 mm or greater (e.g. about 1.5 N/20 mm or greater). The aged peel strength is determined by the method described later in Examples.

(Peel Strength Ratio)

While no particular limitations are imposed, the protective sheet disclosed herein may have a ratio of aged peel strength $P_2$ (N/20 mm) to initial peel strength $P_1$ (N/20 mm) (i.e. a $P_2/P_1$ ratio value) of 5 or lower. A small $P_2/P_1$ ratio value indicates a small increase in peel strength with aging. By this, initial adhesion and light peel during removal are favorably combined. From such a standpoint, the $P_2/P_1$ ratio is preferably 4 or lower, more preferably 3 or lower, or yet more preferably 2 or lower, for instance, 1.8 or lower, 1.5 or lower, or even 1.3 or lower. The $P_2/P_1$ ratio is typically 0.8 or higher; it can be, for instance, 1 or higher.

(VOC Emission)

From the standpoint of environmental sanity, the protective sheet disclosed herein preferably has a total amount of volatile organic compounds (VOC) of 1000 µg or less emitted from 1 g thereof (possibly including a substrate layer and a PSA layer, but not a release liner) when heated at 80° C. for 30 minutes (or, for short, a VOC emission of 1000 µg/g or less). The VOC emission is more preferably 500 µg/g or less (e.g. 300 µg/g or less, typically 100 µg/g or less). The VOC emission is determined by the next method.

[VOC Test]

The protective sheet is cut to a prescribed size (to an about 5 cm² sized area, here) and the release liner is removed to prepare a test piece. The test piece is placed and sealed in a 20 mL vial. The vial is then heated at 80° C. for 30 minutes and 1.0 mL of the heated gas (sample gas) is injected into a gas chromatograph (GC), using a head space autosampler (HSS). Based on the resulting gas chromatogram, the amount of gas emitted from the test piece is determined as an n-decane equivalent amount. From the resulting value, the VOC emission is determined per gram of protective sheet (µg/g, excluding the release liner). The n-decane equivalent amount is determined by applying a calibration curve prepared in advance for n-decane, with the intensities of emission gas obtained by GC Mass seen as equivalent to the intensities of n-decane. The HSS and GC settings are as follows:

HSS: model 7694 available from Agilent Technologies
  Heating time: 30 min
  Pressurization time: 0.12 min
  Loop filling time: 0.12 min
  Loop equilibration time: 0.05 min
  Injection time: 3 min
  Sample loop temperature: 160° C.
  Transfer line temperature: 200° C.
GC: model 6890 available from Agilent Technologies
  Column: J&W capillary column, product name DB-ffAP, available from GL Science (0.533 mm inner diameter× 30 m length, 1.0 µm thick membrane)
  Column temperature: 250° C. (temperature raised at 10° C./min from 40° C. to 90° C., followed at 20° C./min to 250° C. and maintained there for 5 min)
  Colum pressure: 24.3 kPa (constant flow mode)
  Carrier gas: helium (5.0 mL/min)
  Injection port: split (split ratio 12:1)
  Injection port temperature: 250° C.
  Detector: FID
  Detector temperature: 250° C.

The protective sheet disclosed herein may have a level of anti-erosive properties evaluated as no discoloration in the Low-E glass plate discoloration test (at 40° C. and 92% RH for 7 days) carried out by the method described later in Examples. The protective sheet satisfying this property can show excellent anti-erosive properties in applications for protecting Low-E glass plates.

<Method for Preparing PSA Composition>

The method for preparing the PSA composition disclosed herein is not particularly limited and a heretofore known or conventional PSA composition preparation method can be suitably employed. While no particular limitations are imposed, the PSA composition preparation method according to some embodiments preferably uses an aqueous liquid that satisfies (a) having an electrical conductivity below 300 µS/cm, (b) having a chloride ion concentration below 35 µg/mL or both. According to the method, it is possible to obtain a PSA composition that can prevent erosion in Low-E glass layer. Such a PSA composition is particularly preferably used for protecting Low-E glass plates.

(Obtaining of Aqueous Liquid)

The method for preparing the PSA composition according to some embodiments may include a step of obtaining the aqueous liquid. The aqueous liquid satisfying the (a) and/or (b) can be obtained by selecting, upon analysis if necessary, an aqueous liquid that has a desirable electrical conductivity and/or a chloride ion concentration among raw water including surface water, groundwater (possibly well water), tap water and treated water obtained upon known water treatment.

In some preferable embodiments, the aqueous liquid is obtained by subjecting an aqueous liquid (untreated aqueous liquid) such as raw water to a known treatment such as filtration, membrane separation, ion exchange, distillation, physical adsorption, and electrolysis. In particular, a more preferable treatment is membrane separation using a reverse osmosis membrane, nanofiltration membrane, ultrafiltration membrane, precision filtration membrane and the like with the reverse osmosis membrane being particularly preferable. When ion exchange is selected as the water treatment method, cation exchange (using cation exchange resin), anion exchange (using anion exchange resin) or a mixed bed thereof can be used; however, from the standpoint of removing anions (typically chloride ions) as primary contributors to erosion, anion exchange is preferably selected when using ion exchanged water. In this embodiment, the untreated aqueous liquid used in the treatment process has an electrical conductivity of 300 µS/cm or higher and a chloride ion concentration of 35 µg/mL or greater. The treatment system is not particularly limited and a known or commonly used treatment system can be used. The treatment conditions can be suitably set in accordance with the untreated water, system and required water quality without particular limitations.

(Preparation of PSA Composition)

Subsequently, the aqueous liquid obtained as described above is used to obtain a polymer-containing liquid that comprises a polymer (base polymer) as an adhesive component. In other words, the method disclosed herein may include a step of obtaining a polymer containing liquid comprising the aqueous liquid and a polymer. The usage of the aqueous liquid is not particularly limited as long as it is used for preparing a PSA composition. The timing for using it is not particularly limited, either. The aqueous liquid is also referred to as water for PSA composition preparation (or PSA composition prep water). The prep water can be water used in the polymerization (hereinafter as "polymerization water"), water added after the polymerization (water added afterwards), etc. The resulting polymer containing liquid can be used as the PSA composition or it can be further mixed with additives to prepare the PSA composition. The PSA composition obtained using the aqueous liquid can be a water-dispersed PSA composition in which the polymer is at least partially (typically entirely) dispersed in the aqueous liquid. The particulars of the polymer (typically the base polymer) used in the PSA composition as well as the particulars of the PSA composition and other matters related to preparation of the PSA composition are as described earlier and redundant details are thus omitted.

In some preferable embodiments, the aqueous liquid is used as polymerization water in emulsion polymerization. In other words, the PSA composition preparation method disclosed herein may include a step of obtaining a polymer by carrying out emulsion polymerization in the presence of the aqueous liquid. The particulars of the polymer obtained by emulsion polymerization are as described earlier and redundant details are thus omitted.

(Properties of Aqueous Liquid)

In some embodiments, the aqueous liquid used for preparing the PSA composition is not particularly limited in electrical conductivity. Chloride ions in the aqueous liquid are preferably limited to below the prescribed quantity. In such a case, it is not essential to have an electrical conductivity below 300 μS/cm. Thus, in other embodiments, the electrical conductivity of the aqueous liquid is not particularly limited. On the other hand, because the electrical conductivity correlates with the ion concentration in the aqueous liquid, from the standpoint of limiting the erosive ion amount, the electrical conductivity of the aqueous liquid in another embodiment is preferably below 300 μS/cm, more preferably below 200 μS/cm, yet more preferably below 100 μS/cm, or particularly preferably below 50 μS/cm (e.g. below 30 μS/cm, or even below 15 μS/cm). Such an aqueous liquid can be used as an anti-erosion medium without quantifying chloride ions which are considered a primary contributor to erosion.

The minimum electrical conductivity of the aqueous liquid used can be the theoretical lower limit (around 0.05 μS/cm at room temperature). In view of the productivity, allowable level for practical use, etc., it can be about 1 μS/cm or higher, about 5 μS/cm or higher, about 10 μS/cm or higher, about 50 μS/cm or higher (e.g. about 100 μS/cm or higher, or even about 200 μS/cm or higher).

The electrical conductivity of the aqueous liquid is determined at room temperature (23° C.), using a commercial electrical conductivity (EC) meter. In particular, a portable EC meter ES-71 available from Horiba, Ltd. or a comparable product can be used for the measurement.

In some embodiments, the aqueous liquid used for preparing the PSA composition is preferably limited in chloride ion concentration. In particular, when the aqueous liquid has an electrical conductivity of 300 μS/cm or higher, it preferably has a chloride ion concentration below 35 μg/mL. This can bring about anti-erosion effects. While no particular limitations are imposed, the chloride ion concentration in the aqueous liquid is preferably below 35 μg/mL even when the electrical conductivity is below 300 μS/cm. In this case, the aqueous liquid used in the preparation of PSA composition disclosed herein comprises less than 35 μg/mL of chloride ions regardless of electrical conductivity.

In some embodiments, the chloride ion concentration in the aqueous liquid is suitably below 35 μg/mL (e.g. below 30 μg/mL), preferably below 25 μg/mL, more preferably below 20 μg/mL, yet more preferably below 15 μg/mL, particularly preferably below 10 μg/mL, most preferably below 5 μg/mL, or possibly even below 3 μg/mL (e.g. below 1 μg/mL). The minimum chloride ion concentration in the aqueous liquid is ideally 0 μg/mL; however, in view of the productivity, allowable level for practical use, etc., it can be about 1 μg/mL or greater, or even about 3 μg/mL or greater.

In some preferable embodiments, the aqueous liquid has a ratio ($A_{Cl}/C$) of chloride ion concentration $A_{Cl}$ (μg/mL) to electrical conductivity C (μS/cm) of about 1/5 or lower. That the $A_{Cl}/C$ ratio is at or below the prescribed value means that the chloride ion concentration is relatively low among all ions. When the $A_{Cl}/C$ ratio is about 1/5 or lower, prevention of erosion can be preferably combined with productivity. The $A_{Cl}/C$ ratio is more preferably about 1/8 or lower, about 1/10 or lower, or about 1/15 or lower. The minimum $A_{Cl}/C$ ratio is not particularly limited and can be about 1/30 or higher (e.g. 1/20 or higher).

From the standpoint of preventing erosion, the aqueous liquid used for preparing the PSA composition according to some embodiments is desirably limited in sulfate ion concentration. The sulfate ion concentration in the aqueous liquid is about 50 μg/mL or less, suitably about 35 μg/mL or less (e.g. about 25 μg/mL or less), preferably about 15 μg/mL or less, more preferably about 5 μg/mL or less, or yet more preferably about 2 μg/mL or less (e.g. about 1 μg/mL or less). The minimum sulfate ion concentration in the aqueous liquid is ideally 0 μg/mL; however, in view of the productivity, allowable level for practical use, etc., it can be about 10 μg/mL or greater, or even about 20 μg/mL or greater.

From the standpoint of preventing erosion, the aqueous liquid used in the preparation of PSA composition according to some embodiments is desirably limited in nitrate ion concentration. The nitrate ion concentration in the aqueous liquid is about 30 μg/mL or less, suitably about 20 μg/mL or less (e.g. about 10 μg/mL or less), preferably about 7 μg/mL or less, more preferably about 5 μg/mL or less, or yet more preferably about 2 μg/mL or less (e.g. about 1 μg/mL or less). The minimum nitrate ion concentration in the aqueous liquid is ideally 0 μg/mL; however, in view of the productivity, allowable level for practical use, etc., it can be about 1 μg/mL or greater, about 3 μg/mL or greater, or even about 5 μg/mL or greater (e.g. 10 μg/mL or greater).

In the aqueous liquid used for preparing the PSA composition according to some embodiments, the total concentration of nitrate, sulfate and chloride ions is suitably about 80 μg/mL or less. By limiting the total concentration of these erosive ion species, erosion can be more assuredly prevented. The total concentration of the three ion species is preferably below 50 μg/mL, more preferably below 30 μg/mL, yet more preferably below 15 μg/mL, or possibly about 10 μg/mL or less (e.g. about 5 μg/mL or less). The minimum total concentration of the three ion species in the aqueous liquid is ideally 0 μg/mL; however, from the standpoint of the productivity, allowable level for practical use, etc., it can be about 1 μg/mL or greater, about 5 μg/mL or greater, or even about 10 μg/mL or greater (e.g. 30 μg/mL or greater).

From the standpoint of preventing erosion, in the art disclosed herein, among the ions in the aqueous liquid, it is preferable to limit the anion concentration (typically the chloride ion concentration). On the other hand, the cation concentration in the aqueous liquid is not particularly limited. In some embodiments, the cation concentration in the aqueous liquid can be in the range where the electrical conductivity is below 300 μS/cm. For instance, the concentration of calcium and magnesium ions removed by a general water-softening process is not particularly limited. The concentration of calcium and magnesium ions in the aqueous liquid used in the preparation of PSA composition can be 1 μg/mL or greater, about 10 μg/mL or greater, or even 20 μg/mL or greater.

The concentrations of chloride ions, sulfate ions, nitrate ions, calcium ions and magnesium ions in the aqueous liquid can be determined by ion chromatography using the respective commercial standard ion solutions (e.g. available from Wako Pure Chemical industries, Ltd.). In particular, they are determined by the method described below.

[Quantification of Ions in Aqueous Liquid]

Ion chromatography analysis was carried out, using the respective commercial standard ion solutions (available from Wako Pure Chemical industries, Ltd.). The ion chromatography conditions were as shown below.

(Analytical Conditions)

Anion Analysis:
  System: ICS-3000 available from Thermo Fisher Scientific
  Separation column: Dionex IonPac AS18-Fast (4 mm×250 mm)
  Guard column: Dionex IonPac AG18-Fast (4 mm×50 mm)
  Removal system: Dionex AERS-500 (external mode)
  Detector: electrical conductivity detector
  Eluent: aqueous KOH solution (eluent generator cartridge used)
  Eluent flow rate: 1.0 ml/min
  Sample injection solution: 250 μL Cation Analysis:
  System: DX-320 available from Thermo Fisher Scientific
  Separation column: Dionex Ion Pac CS16 (5 mm×250 mm)
  Guard column: Dionex Ion Pac CG16 (5 mm×50 mm)
  Removal system: Dionex CSRS-500 (recycle mode)
  Detector: electrical conductivity detector
  Eluent: aqueous methanesulfonic acid solution
  Eluent flow rate: 1.0 mL/min
  Sample injection solution: 25 μL The aqueous liquid disclosed herein refers to a liquid whose primary component is water ($H_2O$) and it may include an organic solvent such as alcohol at a lower percentage than that of water. In typical, a liquid comprising more than 50% water by volume is used as the aqueous liquid. The water content of the aqueous liquid is, for instance, about 90% by volume or higher, or suitably about 99% by volume or higher (e.g. 99.9% by volume or higher).

<Method for Producing Protective Sheet>

The art disclosed herein includes a method for producing a protective sheet. The protective sheet production method may comprise a step of obtaining a PSA composition by the preparation method described above and a step of forming a PSA layer from the resulting PSA composition. Because PSA-caused erosion can be prevented, the protective sheet having such a PSA layer is particularly preferably used for protection of Low-E glass plates. When the protective sheet has a substrate layer and a PSA layer, the method for producing the protective sheet may include a step of providing a PSA layer to one face of the substrate layer.

The PSA layer can be formed based on a known method for forming PSA layers in PSA sheets. For instance, it is preferable to employ a direct method where the PSA composition is directly provided (typically applied) to the substrate and allowed to cure to form a PSA layer. Alternatively, it is also possible to employ a transfer method where the PSA composition is provided to a releasable surface (release face) and allowed to cure to form a PSA layer on the surface and the resulting PSA layer is transferred to the substrate. As the release face, the surface of a release liner, the substrate's backside treated with release agent, or the like can be used. While the PSA layer is typically formed in a continuous form, it can be formed in a regular or random pattern of dots, stripes, etc.

The PSA composition can be applied, using a heretofore known coater, for instance, a gravure roll coater, reverse roll coater, kiss roll coater, dip roll coater, die coater, bar coater, knife coater and spray coater. Alternatively, the PSA composition can be applied by immersion, curtain coating, etc. From the standpoint of accelerating the crosslinking reaction, increasing the productivity, etc., the PSA composition is preferably dried with heat. The drying temperature is possibly, for example, 40° C. to 150° C. or preferably 50° C. to 130° C. (e.g. 60° C. to 100° C.). After dried, the PSA composition can be allowed to further age for purposes such as adjusting the distribution or migration of components in the PSA layer, advancing the crosslinking reaction, and lessening the strain possibly present in the substrate and the PSA layer.

<Glass Unit Production Method>

The glass unit production method disclosed herein comprises a step (A) of obtaining a Low-E glass plate comprising a glass substrate and a Low-E layer placed on the glass substrate; a step (B) of applying a protective sheet to the Low-E layer surface of the Low-E glass plate; an optional step (C) of subjecting the Low-E glass plate with the protective sheet adhered thereon to at least one process selected from the group consisting of transportation, storage, processing, washing and handling; a step (D) of removing the protective sheet from the Low-E glass plate; and a step (E) of assembling a glass unit using the Low-E glass plate. In this method, the protective sheet (or surface-protective sheet) disclosed herein is used. Further description is provided below while referring to FIG. 1.

First, in the step (A), as shown in FIG. 2(A), a Low-E glass plate 100 having a glass substrate 110 and a Low-E layer 120 placed on the glass substrate 110 is obtained (S10). Low-E glass plate 100 is obtained by forming Low-E layer 120 on one face of glass substrate 110. The Low-E layer comprises a metal layer, an oxide layer such as a metal oxide layer, and a nitride layer such as silicon nitride; usually has a multi-layer structure; and is formed by a known or conventionally-used method such as sputtering. The materials forming the respective layers in the Low-E layer include $TiO_2$, $ZrO_2$, $Si_XN_Y$, $ZnO_X$, Ag, $NiCrO_X$, and $SnO_2$. As an infrared-reflective layer, a Ag layer is preferably used. In the Low-E layer according to some embodiments, the Ag layer is typically present between $ZnO_X$ layers. The material of the Low-E layer's outermost surface (to which the protective sheet is applied) is often an oxide such as $TiO_2$, $ZrO_2$, $ZnO_X$, $NiCrO_X$ and $SnO_2$ layers or a nitride such as a $Si_XN_Y$ layer; it typically is not a metal such as Ag. Depending on the required properties, the Low-E layer may have a multi-layer structure with 5 or more layers, for instance, 10 or more layers, or even 15 or more layers. The thickness of each layer is not particularly limited. It is usually 0 to 1000 Å, or suitably about 10 Å to 700 Å, for instance, about 30 Å to 300 Å. The thickness (overall thickness) of the Low-E layer can be about 10 nm to 1000 nm (e.g. about 50 nm to 500 nm). The size of the glass substrate is not particularly limited with one side (width) being, for instance, about 1 m or greater, or about 2 m or greater. Lately, pieces having surface areas larger than 2.6 m at one side or even as large as about 3 m or greater (e.g. about 3.3 m or greater) at one side are used. The Low-E glass plate can be a generally available one including a commercial product, a modified version thereof, or a product prepared by a known or conventional method.

In the step (B), as shown in FIG. 2(B), a protective sheet 200 is applied to the surface of Low-E layer 120 formed on glass substrate 110 (S20). Protective sheet 200 is typically applied to the surface in a removable manner. Here, "(to be) applied in a removable manner" means adhesion whose eventual release is intended or expected; in many cases, it refers to adhesion such that the adherend can maintain its surface condition prior to the adhesion basically intact after the protective sheet (PSA sheet) is removed. From the standpoint of the protection, the size of protective sheet 200 is preferably about the same as the surface of Low-E layer 120. Two or more protective sheets may be partially layered to cover the surface to be protected. By covering the surface of Low-E layer 120 with protective sheet 200, the Low-E layer 120 can be prevented or inhibited from corrosion, etc.

After the step (B), as the step (C), with respect to the Low-E glass plate having the protective sheet applied thereon, at least one process may be optionally carried out, selected from the group consisting of transportation, storage, processing, washing and handling (S30). The processing may be the sort of cutting and edge seaming of the Low-E glass plate having the protective sheet applied thereon. The cutting means and the cut size are suitably selected in accordance with the purpose and are not particularly limited. The protective sheet may be left on the Low-E layer surface even after the Low-E glass plate is cut. The cut Low-E glass plate is typically washed with water, etc. In the washing step, in addition to the water, a detergent (including surfactant) may be optionally used. During the transportation, storage, processing such as cutting, washing such as a water wash and various kinds of handling, as shown in FIG. 2(C), by the presence of protective sheet 200 thereon, the Low-E layer 120 is protected from damage, wearing, degradation, corrosion, etc.

Subsequently, in the step (D), protective sheet 200 is removed from Low-E glass plate 100 (S40). The protective sheet 200 is removed from Low-E glass plate 100 (adherend) after achieving the protection purpose. Low-E glass plate 100 from which protective sheet 200 is removed is usually heated and annealed in an oven. Subsequently, as shown in FIG. 2(E), using the Low-E glass plate 100, a glass unit 300 is fabricated (S50). Glass unit 300 is typically a heat-blocking or thermally-insulating glass unit, which can be fabricated by obtaining a pair of glass plates of which at least one is a Low-E glass plate and assembling a pair-glass (e.g. dual-pane glass) with the surface of Low-E layer 120 of Low-E glass plate 100 on the inside. Numbers 320 and 340 in FIG. 2(E) represent another glass plate forming the glass unit 300 and a spacer, respectively. Spacer 340 is placed between Low-E glass plate 100 and another glass plate 320 to create an open space between glass plates 100 and 320. In the method disclosed herein, in addition to the protective sheet, known or conventionally-used powder or coating liquid may be used together.

<Protection Method>

The protection method disclosed herein uses the protective sheet (or surface protective sheet) disclosed herein and typically is a method for partially or entirely protecting the surface of a Low-E glass plate. The protection method disclosed herein is characterized by comprising a step of applying the protective sheet to the surface of the Low-E glass plate (an application step).

The protection method disclosed herein may further comprise a step of removing the protective sheet from the Low-E glass plate (a removal step). Between the application step and the removal step, for the article having the protective sheet applied thereon, the method may optionally include at least one process selected from the group consisting of transporting, storing, processing, washing and handling.

A favorable example of the protection method disclosed herein is as described earlier regarding the glass unit production method; the application step and the removal step of this protection method correspond to the steps (B) and (D) in the production method, respectively. Other matters in the protection method are not particularly limited. They can be understood by an ordinarily-skilled person in consideration of the description of the glass unit production method. Thus, details are omitted here.

<Applications>

The protective sheet disclosed herein is favorable as a protective sheet for a glass plate used as a building material such as window glass, etc. The glass plate subject to application (protection) typically comprises a glass substrate and a coating layer placed on the glass substrate, wherein the coating layer may include a metal layer. More specifically, the glass plate has a Low-E layer on one face. The Low-E layer usually includes a layer of metal such as silver. In producing the glass plate, the Low-E layer surface may be left exposed until two glass plates including the Low-E glass plate are assembled into a pair-glass (e.g. dual-pane glass) with the Low-E-layer-side surface on the inside. The protective sheet disclosed herein is preferably used to prevent the Low-E layer surface from damage, wear, degradation, corrosion, etc. In other words, the protective sheet can be used as a protective sheet for a Low-E layer surface. Low-E glass plates have higher levels of heat blocking or thermal insulation as compared to conventional glass plates and can improve the efficiency to cool down or heat up indoor spaces; and therefore, they are widely used as building materials such as window glass. The art disclosed herein may indirectly contribute to energy saving and reduction of greenhouse gas emissions.

From the standpoint of the efficiency of removal, the protective sheet disclosed herein is preferably used on an adherend having a large surface area on which the peel strength tends to be limited. The protective sheet disclosed herein is preferably used in an embodiment where it covers the entire surface of an adherend having a width of about 1 m or greater, for instance, about 1.5 m or greater, or even 2 m or greater (typically about 3 m or greater, or even about 3.3 m or greater). The length of the adherend surface is equal to or greater than the width. In some preferable embodiments, it is preferably used in an embodiment where it entirely covers the surface of one face of a large flat plate (favorably, a flat plate with a smooth surface). In particular, glass plates used for building materials such as window glass are becoming progressively larger in view of efficient production, transportation, etc. It is preferably used in an embodiment where it covers the entire surface of a glass plate (typically the entire Low-E layer surface of the Low-E glass plate) having a large surface area (e.g. with a surface width above 2.6 m, typically with a surface width at or above about 3 m, or even at or above about 3.3 m). Preferable embodiments of the art disclosed herein can maintain good aged removability while providing protection to an adherend with such a large surface area.

The protective sheet disclosed herein may show suppressed aged adhesive strength and thus may provide good efficiency of removal even when, for instance, the period of adhesion to the adherend (which can be the protection period for the adherend) becomes relatively long (typically two weeks or longer, e.g. four weeks or longer). Thus, for instance, it can be favorably used in an embodiment where the protective sheet is removed from the adherend (in particular, a Low-E glass plate) after being applied thereon for two weeks or more (e.g. four weeks or more).

The matters disclosed by this description include the following:

(1) A method for producing a glass unit, the method comprising:
- a step (A) of obtaining a glass plate comprising a glass substrate and a Low-E layer placed on the glass substrate;
- a step (B) of applying a protective sheet to a surface of the Low-E layer of the Low-E glass plate;
- an optional step (C) of subjecting the Low-E glass plate to at least one process selected from the group consisting of transportation, storage, processing, washing and handling;
- a step (D) of removing the protective sheet from the Low-E glass plate; and
- a step (E) of assembling a glass unit using the Low-E glass plate;
- wherein
- the protective sheet has a PSA layer, and
- the PSA layer comprises at least 95% base polymer by weight.

(2) The method according to (1) above, wherein the Low-E glass plate has a width of 1 m or greater.

(3) The method according to (1) above, wherein the Low-E glass plate has a width of 2 m or greater.

(4) The method according to (1) above, wherein the Low-E glass plate has a width greater than 2.6 m.

(5) The method according to (1) above, wherein the Low-E glass plate has a width of 3 m or greater.

(6) The method according to any of (1) to (5) above, wherein the Low-E layer comprises a metal layer.

(7) The method according to any of (1) to (5) above, wherein the Low-E layer comprises a silver layer.

(8) The method according to any of (1) to (7) above, wherein the Low-E layer has a thickness of 1000 nm or less.

(9) The method according to any of (1) to (8) above, wherein the step (B) includes a step of entirely covering one face of the Low-E glass plate with at least one of the protective sheet.

(10) The method according to any of (1) to (9) above, wherein the step (C) is essential and in the step (C), the Low-E glass plate is washed using water.

(11) A method for protecting a Low-E glass plate, the method comprising a step (application step) of applying a protective sheet to a surface of a Low-E glass plate that has a glass substrate and a Low-E layer placed on the glass substrate, wherein
- the protective sheet has a PSA layer, and
- the PSA layer comprises at least 95% base polymer by weight.

(12) The method according to (11) above,
- the method further comprising a step (removal step) of removing the protective sheet from the Low-E glass plate, and
- the method optionally including, between the application step and the removal step, at least one process selected from the group consisting of transportation, storage, processing, washing and handling of the Low-E glass plate with the protective sheet adhered thereon.

(13) The method according to (11) or (12) above, wherein the Low-E glass plate has a width of 1 m or greater, and the application step comprises a step of entirely covering one face of the Low-E glass plate with at least one of the protective sheet.

(14) The method according to any of (1) to (13) above, having a chloride ion amount of less than 300 μg per gram of PSA layer, determined by hot water extraction.

(15) The method according to any of (1) to (14) above, wherein the PSA layer is formed from a water-dispersed PSA composition.

(16) The method according to any of (1) to (15) above, wherein the PSA layer comprises up to 3% rust inhibitor by weight.

(17) The method according to (16) above, wherein the rust inhibitor is an amine-based rust inhibitor.

(18) The method according to any of (1) to (17) above, wherein the base polymer is selected between an acrylic polymer and a rubber-based polymer.

(19) The method according to any of (1) to (18) above, wherein the base polymer is crosslinked with a crosslinking agent.

(20) The method according to (19) above, wherein the crosslinking agent is an oxazoline-based crosslinking agent.

(21) A protective sheet having a PSA layer, wherein the PSA layer comprises at least 95% base polymer by weight.

(22) The protective sheet according to (21) above, having a chloride ion amount of less than 300 μg per gram of PSA layer, determined by hot water extraction.

(23) The protective sheet according to (21) or (22) above, wherein the PSA layer is formed from a water-dispersed PSA composition.

(24) The protective sheet according to any of (21) to (23) above, wherein the PSA layer comprises up to 3% rust inhibitor by weight.

(25) The protective sheet according to (24), wherein the rust inhibitor is an amine-based rust inhibitor.

(26) The protective sheet according to any of (21) to (25) above, wherein the base polymer is selected between an acrylic polymer and a rubber-based polymer.

(27) The protective sheet according to any of (21) to (26) above, wherein the base polymer is crosslinked with a crosslinking agent.

(28) The protective sheet according to (27) above, wherein the crosslinking agent is an oxazoline-based crosslinking agent.

(29) The protective sheet according to any of (21) to (28) above, having a substrate layer supporting the PSA layer.

(30) The protective sheet according to any of (21) to (29) above, having a 180° peel strength of 3.3 N/20 mm or less to a Low-E glass plate after applied thereon at 50° C. for one week.

(31) The protective sheet according to any of (21) to (30) above, that is a Low-E glass plate protective sheet.

Several working examples related to the present invention are described below, but the present invention should not be limited to the Examples. In the description below, "part(s)" and "%" are by weight unless otherwise specified.

<Test Methods>

[Determination of Gel Fraction and Degree of Swelling]

A PSA layer sample (weight: $W_1$) weighing approximately 0.1 g is wrapped into a pouch with a porous polytetrafluoroethylene membrane (weight: $W_2$) having a mean pore diameter of 0.2 μm, and the opening is tied with twine (weight: $W_3$). As the porous polytetrafluoroethylene membrane, product name NITOFLON® NTF 1122 (available from Nitto Denko Corporation; 0.2 μm mean pore diameter, 75% porosity, 85 μm thickness) or an equivalent product is used. The resulting package is immersed in 50 mL of ethyl acetate and stored at room temperature (typically 23° C.) for 7 days. Subsequently, the package is taken out, and any residual ethyl acetate is wiped off the outer surface. The package weight ($W_4$) is measured. The package is then dried at 130° C. for 2 hours and the package weight ($W_5$) is measured. The gel fraction and the degree of swelling of the PSA layer can be determined by substituting the respective values into the following equations:

$$\text{Gel fraction (\%)} = [(W_5 - W_2 - W_3)/W_1] \times 100$$

$$\text{Degree of swelling (fold)} = (W_4 - W_2 - W_3)/(W_5 - W_2 - W_3)$$

[Initial Peel Strength]

The protective sheet to be measured is cut to a 20 mm wide by 100 mm long strip to prepare a test piece. In a standard environment at 23° C., 50% RH, with a 2 kg rubber roller moved back and forth twice, the test piece is press-bonded to a Low-E glass plate as the adherend. The sample is stored in the standard environment for 30 minutes. In the same standard environment, using a universal tensile tester, the initial peel strength (initial to-glass adhesive strength) (N/20 mm) is determined at a tensile speed of 0.3 m/min, at 180° peel angle. As the Low-E glass plate, product number RSFL6AS (100 mm×100 mm) available from Nippon Sheet Glass Co., Ltd. is used. It is noted that as the adherend, any Low-E glass plate can be used without particular limitations and a product comparable to RSFL6AS or other commercial Low-E glass plates can be used as well.

[Aged Peel Strength]

The protective sheet to be measured is cut to a 20 mm wide by 100 mm long strip to prepare a test piece. In a standard environment at 23° C., 50% RH, with a 2 kg rubber roller moved back and forth twice, the test piece is press-bonded to a Low-E glass plate as the adherend. The sample is stored in an environment at 50° C. for seven days and then in a standard environment at 23° C., 50% RH for one hour. Subsequently, in the same standard environment, using a universal tensile tester, the aged peel strength (aged to-glass adhesive strength) (N/20 mm) is determined at a tensile speed of 0.3 m/min, at 180° peel angle. The Low-E glass plate used as the adherend is the same as the one used in the initial peel strength measurement.

[Chloride Ion Amount of PSA (Layer)]

The protective sheet subject to measurement is washed well with pure water, cut to a 200 cm² sized sheet area and the PSA is collected alone. The collected PSA is placed in a polypropylene (PP) container and weighed. 25 mL of pure water is added to the PP container. Using a drier, thermal extraction is carried out at 120° C. for one hour. With respect to the resulting extract, by ion chromatography, chloride ions in the extract are quantified using commercial standard chloride ion solutions (available from Wako Pure Chemical industries, Ltd.) to determine the chloride ion amount per gram of PSA used in the extraction. The ion chromatography conditions are as shown below.

(Analytical Conditions)

Anion Analysis:
    System: ICS-3000 available from Thermo Fisher Scientific
    Separation column: Dionex IonPac AS18-Fast (4 mm×250 mm)
    Guard column: Dionex IonPac AG18-Fast (4 mm×50 mm)
    Removal system: Dionex AERS-500 (external mode)
    Detector: electrical conductivity detector
    Eluent: aqueous KOH solution (eluent generator cartridge used)
    Eluent flow rate: 1.0 mL/min
    Sample injection solution: 250 μL Cation Analysis:
    System: DX-320 available from Thermo Fisher Scientific
    Separation column: Dionex Ion Pac CS16 (5 mm×250 mm)
    Guard column: Dionex Ion Pac CG16 (5 mm×50 mm)
    Removal system: Dionex CSRS-500 (recycle mode)
    Detector: electrical conductivity detector
    Eluent: aqueous methanesulfonic acid solution
    Eluent flow rate: 1.0 mL/min
    Sample injection solution: 25 μL

[Chloride Ion Amount of Protective Sheet]

The protective sheet subject to measurement is washed well with pure water, cut to a 50 cm² sized sheet area, placed in a polypropylene (PP) container and weighed. Using a drier, thermal extraction is carried out at 120° C. for one hour. 25 mL of pure water is added to the PP container. Using a drier, thermal extraction is carried out at 120° C. for one hour. With respect to the resulting extract, by ion chromatography, chloride ions in the extract are quantified using commercial standard chloride ion solutions (available from Wako Pure Chemical industries, Ltd.) to determine the chloride ion amount per gram of protective sheet used in the extraction. The analytical conditions for ion chromatography are the same as the measurement conditions for the chloride ion amount of PSA.

[Removability of PSA Sheet]

Because an aged peel strength above 3.3 N/20 mm tends to result in poor removability, based on this knowledge, it is graded as "Good" when the aged peel strength was at or below 3.3 N/20 mm, and as "Poor" when above 3.3 N/20 mm.

[Low-E Glass Corrosion Test]

The protective sheet is cut to a 20 mm wide, 100 mm long strip to prepare a test piece. In a standard environment at 23° C. and 50% RH, the test piece is press-bonded to the Low-E layer surface of a Low-E glass plate as the adherend with a 2 kg rubber roller moved back and forth twice. As the Low-E glass plate, product number RSFL6AS (100 mm×100 mm) available from Nippon Sheet Glass Co., Ltd. is used. The sample is stored in an environment at 40° C. and 92% RH for 7 days and the protective sheet is then removed. With respect to the area protected with the protective sheet, the state of the glass plate surface is visually inspected. The following grades are assigned: "Excellent" when no discoloration is observed, "Good" when a practically acceptable level of minor discoloration is observed, and "Fail" when discoloration is observed. It is noted that as the adherend, any Low-E glass plate can be used without particular limitations and a product comparable to RSFL6AS or other commercial Low-E glass plate can be used as well.

Example 1

Were mixed a starting monomer mixture comprising 58 parts of 2-ethylhexyl acrylate, 40 parts of n-butyl methacrylate and 2 parts of acrylic acid with 3 parts of surfactant (trade name AQUALON KH-1025 available from Dai-ichi Kogyo Seiyaku Co., Ltd.; ammonium polyoxyethylene-1-(allyloxymethyl) alkyl ether sulfate with up to 30 moles of added EO) and 150 parts of polymerization water. The resulting mixture was emulsified under nitrogen flow with an emulsifying machine (homo mixer) to prepare an emulsion of the starting monomers.

Into a reaction vessel equipped with a thermometer, nitrogen inlet, condenser and stirrer, was placed the emulsion and heated under nitrogen flow to a liquid temperature of 50° C. while stirring. To this, was added 0.03 part of 2,2'-azobis(2-methylpropionamidine)dihydrochloride (product name V-50 available from Wako Pure Chemical industries, Ltd.) as polymerization initiator and the polymerization reaction was carried out for 5 hours while maintaining the liquid temperature around 50° C. To the resulting polymerization reaction mixture, was added ammonia water and adjusted to around pH 8. An aqueous dispersion of acrylic polymer was thus prepared.

To the water dispersion, per 100 parts of non-volatiles therein, were mixed 2 parts of oxazoline-based crosslinking agent (product name EPOCROS WS-500 available from Nippon Shokubai Co., Ltd.) and 0.5 part of rust inhibitor A (product name LAMIPROOF C-2 available from DKS Co., Ltd.; polyoxyethylene-containing alicyclic amine) to prepare a PSA composition according to this Example.

Of 55 μm thick polyethylene film having one face treated with corona discharge, onto the corona-treated face (first face), was applied the PSA composition with a bar coater to a dried thickness of 6 μm. This was dried at 70° C. for two minutes and then aged at 50° C. for one day to prepare an adhesively single-faced PSA sheet having an acrylic PSA layer on one face of a substrate layer formed of the polyethylene film. The PSA sheet thus obtained was used as a protective sheet according to this Example.

Examples 2 to 5

Rust inhibitor A was used in the amounts show in Table 1. Otherwise in the same manner as Example 1, were obtained protective sheets according to the respective Examples.

Examples 6 to 7

Rust inhibitor A was changed to rust inhibitor B (product name CHELESLITE W-16B available from Chelest Corporation, containing organic acid salt and rust inhibitor for iron) or to rust inhibitor C (product name THIOLITE C-560R13 available from Chiyoda Chemical Co., Ltd., 50-60% triethanolamine). Otherwise in the same manner as Example 3, were obtained protective sheets according to the respective Examples.

With respect to the protective sheet of each Example, Table 1 shows summarized features, gel fraction (%), degree of swelling (fold), initial peel strength (N/20 mm), aged peel strength (N/20 mm), chloride ion amount per gram of PSA (μg/g (PSA)) by hot water extraction, chloride ion amount per gram of protective sheet (μg/g (PSA sheet)) by hot water extraction, results of protective sheet's removability and Low-E glass corrosion tests.

TABLE 1

|  |  |  | Ex. 1 | Ex. 2 | Ex. 3 | Ex. 4 | Ex. 5 | Ex. 6 | Ex. 7 |
|---|---|---|---|---|---|---|---|---|---|
| PSA | Base polymer | Acrylic polymer (pts) | 100 | 100 | 100 | 100 | 100 | 100 | 100 |
|  |  | Reactive surfactant (pts) | 3 | 3 | 3 | 3 | 3 | 3 | 3 |
|  |  | Crosslinking agent (pts) | 2 | 2 | 2 | 2 | 2 | 2 | 2 |
|  | Additive | Rust inhibitor A (pts) | 0.5 | 1.4 | 2.8 | 6 | 8.3 | — | — |
|  |  | Rust inhibitor B (pts) | — | — | — | — | — | 1.4 | — |
|  |  | Rust inhibitor C (pts) | — | — | — | — | — | — | 1.4 |
|  | Percentage of base polymer |  | 99.5% | 98.7% | 97.4% | 94.6% | 92.7% | 98.7% | 98.7% |
|  | Gel fraction |  | 87% | 77% | 73% | 76% | 60% | 87% | 85% |
|  | Degree of swelling (fold) |  | 18 | 17 | 19 | 22 | 24 | 17 | 17 |
| Chloride ion amount | PSA (μg/g) |  | 71 | 102 | 132 | 88 | 215 | 71 | 64 |
|  | Protective sheet (μg/g) |  | 7.0 | 10.0 | 13.0 | 8.7 | 21.1 | 7.0 | 6.3 |
| To-Low-E-glass adhesive strength | Initial (N/20 mm) |  | 2.0 | 2.1 | 2.5 | 3.0 | 3.5 | 1.9 | 1.8 |
|  | Aged (N/20 mm) |  | 1.9 | 1.9 | 2.8 | 3.6 | 4.1 | 2.2 | 1.1 |
| Evaluations | Protective sheet's removability test |  | Good | Good | Good | Poor | Poor | Good | Good |
|  | Low-E glass corrosion test |  | Good | Good | Excellent | Excellent | Excellent | Good | Good |

As shown in Table 1, the PSA sheets according to Examples 1 to 7 all had at least the prescribed initial and aged adhesive strength values and showed pass levels in the Low-E glass corrosion test; and therefore, they can be thought to exhibit good protective properties to Low-E glass plates. The protective sheets according to Examples 1 to 3 and 6 to 7 comprising at least 95% base polymer by weight showed good removability with limited initial and aged adhesive strength values. In these Examples, no surface contamination was observed, either, on the Low-E glass as the object to be protected. In contrast, with respect to Examples 4 to 5 comprising less than 95% base polymer by weight, the PSA sheets showed poor removability. These results indicate that a PSA sheet that has a PSA layer comprising at least 95% base polymer by weight can have protective properties to Low-E glass plates and can also maintain good removability even when prolongedly adhered to the object to be protected.

Although specific embodiments of the present invention have been described in detail above, these are merely for illustrations and do not limit the scope of the claims. The art according to the claims includes various modifications and changes made to the specific embodiments illustrated above.

REFERENCE SIGNS LIST

1: substrate layer
1A: first face
1B: second face
2: PSA layer
2A: adhesive face
10: protective sheet
100: Low-E glass plate
110: glass substrate
120: Low-E layer
200: protective sheet
300: glass unit
320: another glass unit
340: spacer

The invention claimed is:

1. A method for producing a glass unit, the method comprising:
    a step (A) of obtaining a Low-E glass plate that comprises a glass substrate and a Low-E layer placed on the glass substrate;

a step (B) of applying a protective sheet to a surface of the Low-E layer of the Low-E glass plate;

an optional step (C) of subjecting the Low-E glass plate with the protective sheet applied thereon to at least one process selected from the group consisting of transportation, storage, processing, washing and handling;

a step (D) of removing the protective sheet from the Low-E glass plate; and a step (E) of assembling a glass unit using the Low-E glass plate;

wherein, the protective sheet has a pressure-sensitive adhesive layer, the pressure-sensitive adhesive layer is formed from a water-dispersed pressure-sensitive adhesive composition, the pressure-sensitive adhesive layer comprises an acrylic polymer as a base polymer in an amount of 95% by weight or greater, and a rust inhibitor in an amount of 0.01% by weight or greater and less than 5% by weight the acrylic polymer comprises, as a monomer unit, an alkyl (meth)acrylate in an amount of 60% by weight or greater, the alkyl (meth)acrylate has a chemical structure of $CH_2=C(R^1)COOR^2$, wherein $R^1$ is a hydrogen atom or a methyl group, $R^2$ is an alkyl group having 1 to 20 carbon atoms, and the protective sheet contains a chloride ion in an amount of 50 μg or greater and less than 300 μg per gram of pressure-sensitive adhesive layer, determined by hot water extraction.

2. The method according to claim 1, wherein the Low-E glass plate has a width of 1 m or greater.

3. The method according to claim 1, wherein the Low-E glass plate has a width of 2 m or greater.

4. The method according to claim 1, wherein the Low-E glass plate has a width greater than 2.6 m.

5. The method according to claim 1, wherein the Low-E glass plate has a width of 3 m or greater.

6. The method according to claim 1, wherein the Low-E layer includes a metal layer.

7. The method according to claim 1, wherein the Low-E layer includes a silver layer.

8. The method according to claim 1, wherein the Low-E layer has a thickness of 1000 nm or less.

9. The method according to claim 1, wherein the step (B) includes a step of entirely covering one face of the Low-E glass plate with at least one of the protective sheet.

10. The method according to claim 1, wherein the step (C) is essential and in the step (C), the Low-E glass plate is washed using water.

11. A Low-E glass plate protective sheet having a pressure-sensitive adhesive layer, wherein the pressure-sensitive adhesive layer is formed from a water-dispersed pressure-sensitive adhesive composition, the pressure-sensitive adhesive layer comprises an acrylic polymer as a base polymer in an amount of 95% by weight or greater, and a rust inhibitor in an amount of 0.01% by weight or greater and less than 5% by weight, the acrylic polymer comprises, as a monomer unit, an alkyl (meth)acrylate in an amount of 60% by weight or greater, the alkyl (meth)acrylate has a chemical structure of $CH_2=C(R^1)COOR^2$, wherein $R^1$ is a hydrogen atom or a methyl group, $R^2$ is an alkyl group having 1 to 20 carbon atoms, and the protective sheet contains a chloride ion in an amount of 50 μg or greater and less than 300 μg per gram of pressure-sensitive adhesive layer, determined by hot water extraction.

12. The protective sheet according to claim 11, wherein the to the amount of the rust inhibitor is 0.01% by weight or greater and 3% by weight or less in the pressure-sensitive adhesive layer.

13. The protective sheet according to claim 12, wherein the rust inhibitor is an amine-based rust inhibitor.

14. The protective sheet according to claim 11, wherein the acrylic polymer is crosslinked with a crosslinking agent.

15. The protective sheet according to claim 14, wherein the crosslinking agent is an oxazoline-based crosslinking agent.

16. The protective sheet according to claim 11, having a substrate layer supporting the pressure-sensitive adhesive layer.

17. The protective sheet according to claim 11, having a 180° peel strength of 3.3 N/20 mm or less to a Low-E glass plate after applied thereon at 50° C. for one week.

18. The protective sheet according to claim 11, wherein the rust inhibitor is at least one selected from the group consisting of amine salts of organic and inorganic acids, triethanolamine, aliphatic acid-based amine compounds, alicyclic amines, nitrites, ammonium benzoate, ammonium phthalate, ammonium stearate, ammonium palmitate, ammonium oleate, ammonium carbonate, dicyclohexyl aminebenzoic acid salts, urea, urotropin, thiourea, phenyl carbamate, and cyclohexylammonium-N-cyclohexyl carbamate.

19. The protective sheet according to claim 11, wherein the rust inhibitor is at least one selected from the group consisting of triethanolamine, aliphatic acid-based amine compounds, alicyclic amines, ammonium benzoate, ammonium phthalate, ammonium stearate, ammonium palmitate, ammonium oleate, ammonium carbonate, dicyclohexyl aminebenzoic acid salts, urea, urotropin, thiourea, phenyl carbamate, and cyclohexylammonium-N-cyclohexyl carbamate.

20. The protective sheet according to claim 11, wherein the acrylic polymer is crosslinked with an oxazoline-based crosslinking agent, and the rust inhibitor comprises an amine-based rust inhibitor.

* * * * *